United States Patent
Rossi

(10) Patent No.: US 10,130,955 B2
(45) Date of Patent: *Nov. 20, 2018

(54) METHOD AND SYSTEM OF USING ELECTROMAGNETISM TO CONTROL FERTILIZER LEACHING

(71) Applicant: Timothy James Rossi, Salinas, CA (US)

(72) Inventor: Timothy James Rossi, Salinas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/648,946

(22) Filed: Jul. 13, 2017

(65) Prior Publication Data

US 2017/0312758 A1 Nov. 2, 2017

Related U.S. Application Data

(63) Continuation of application No. 15/176,923, filed on Jun. 8, 2016, now Pat. No. 9,707,568, which is a continuation of application No. PCT/US2014/070094, filed on Dec. 12, 2014.

(60) Provisional application No. 61/915,967, filed on Dec. 13, 2013.

(51) Int. Cl.
| | |
|---|---|
| *B03C 1/023* | (2006.01) |
| *B03C 1/28* | (2006.01) |
| *C02F 103/06* | (2006.01) |
| *C02F 101/16* | (2006.01) |

(Continued)

(52) U.S. Cl.
CPC .............. *B03C 1/286* (2013.01); *B03C 1/023* (2013.01); *B03C 2201/22* (2013.01); *B09C 2101/00* (2013.01); *C02F 1/487* (2013.01); *C02F 2101/101* (2013.01); *C02F 2101/105* (2013.01);

(Continued)

(58) Field of Classification Search
CPC ..... B03C 1/286; B03C 1/023; B03C 2201/22; B09C 2101/00; C02F 1/487; C02F 2101/101; C02F 2101/105; C02F 2201/48
See application file for complete search history.

(56) References Cited

U.S. PATENT DOCUMENTS

| | | |
|---|---|---|
| 4,344,074 A | 8/1982 | Strosser |
| 4,594,215 A | 6/1986 | Panson |
| 5,074,986 A | 12/1991 | Probstein |

(Continued)

FOREIGN PATENT DOCUMENTS

WO    WO-9641689 A2 * 12/1996 ............. B09C 1/085

*Primary Examiner* — Benjamin F Fiorello
(74) *Attorney, Agent, or Firm* — D. Benjamin Borson; Borson Law Group PC

(57) ABSTRACT

Devices are provided comprising one or more insulated hollow vertical pipes inserted into a bed of soil, each pipe having a descending and an ascending conductive element forming a loop within the interior of the pipe. A plurality of such vertical pipes can be attached to a straight pipe, forming a two dimensional array of vertical pipes, in which the loops are connected in series. Further, a series of such one-dimensional straight pipes can be attached together to provide a two-dimensional array. When vertical pipes are inserted into the bed of soil and an electrical current applied to the array, one or more magnetic fields is produced within the bed and parallel to the surface of the bed. The magnetic fields so produced impede downward flow of ionic fertilizers into the ground water, and retaining the fertilizer near growing plants when the bed is irrigated.

17 Claims, 16 Drawing Sheets

(51) Int. Cl.
 *C02F 101/10* (2006.01)
 *C02F 1/48* (2006.01)
(52) U.S. Cl.
 CPC .... *C02F 2101/163* (2013.01); *C02F 2103/06* (2013.01); *C02F 2201/48* (2013.01)

(56) References Cited

U.S. PATENT DOCUMENTS

| | | |
|---|---|---|
| 5,420,402 A | 5/1995 | Bridges |
| 5,424,649 A | 6/1995 | Gluck |
| 5,570,030 A | 10/1996 | Wightman |
| 5,846,393 A | 12/1998 | Clarke |
| 5,865,964 A | 2/1999 | Clarke |
| 5,914,020 A | 6/1999 | Griffith |
| 6,086,739 A | 7/2000 | Hodko |
| 6,093,287 A | 7/2000 | Sanderson |
| 6,193,867 B1 | 2/2001 | Hitchens |
| 6,203,682 B1 | 3/2001 | Hodko |
| 6,984,306 B2 | 1/2006 | Doering |
| 2004/0126190 A1 | 7/2004 | Stegemeier |
| 2013/0192129 A1 | 8/2013 | Schmidt |

\* cited by examiner

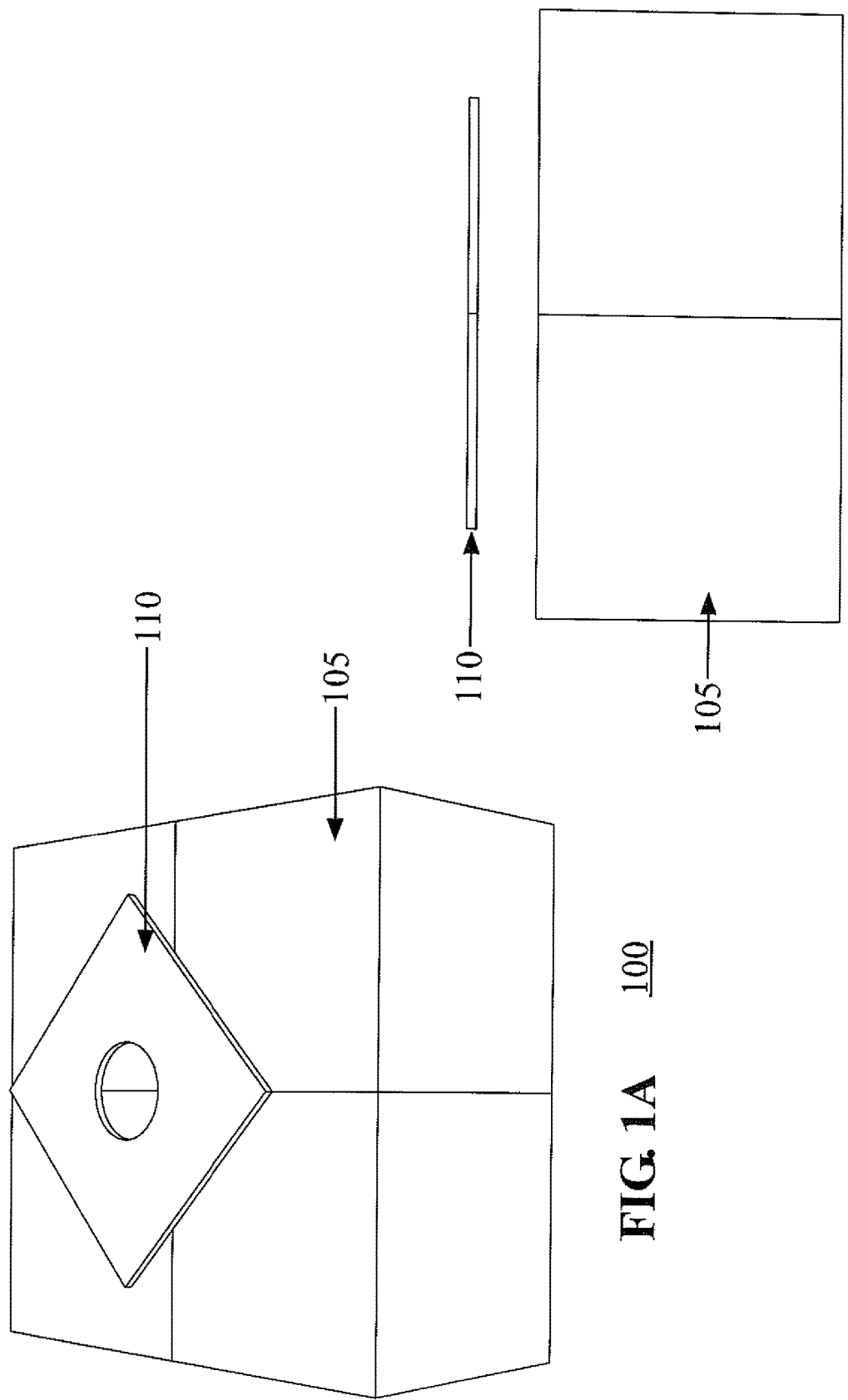

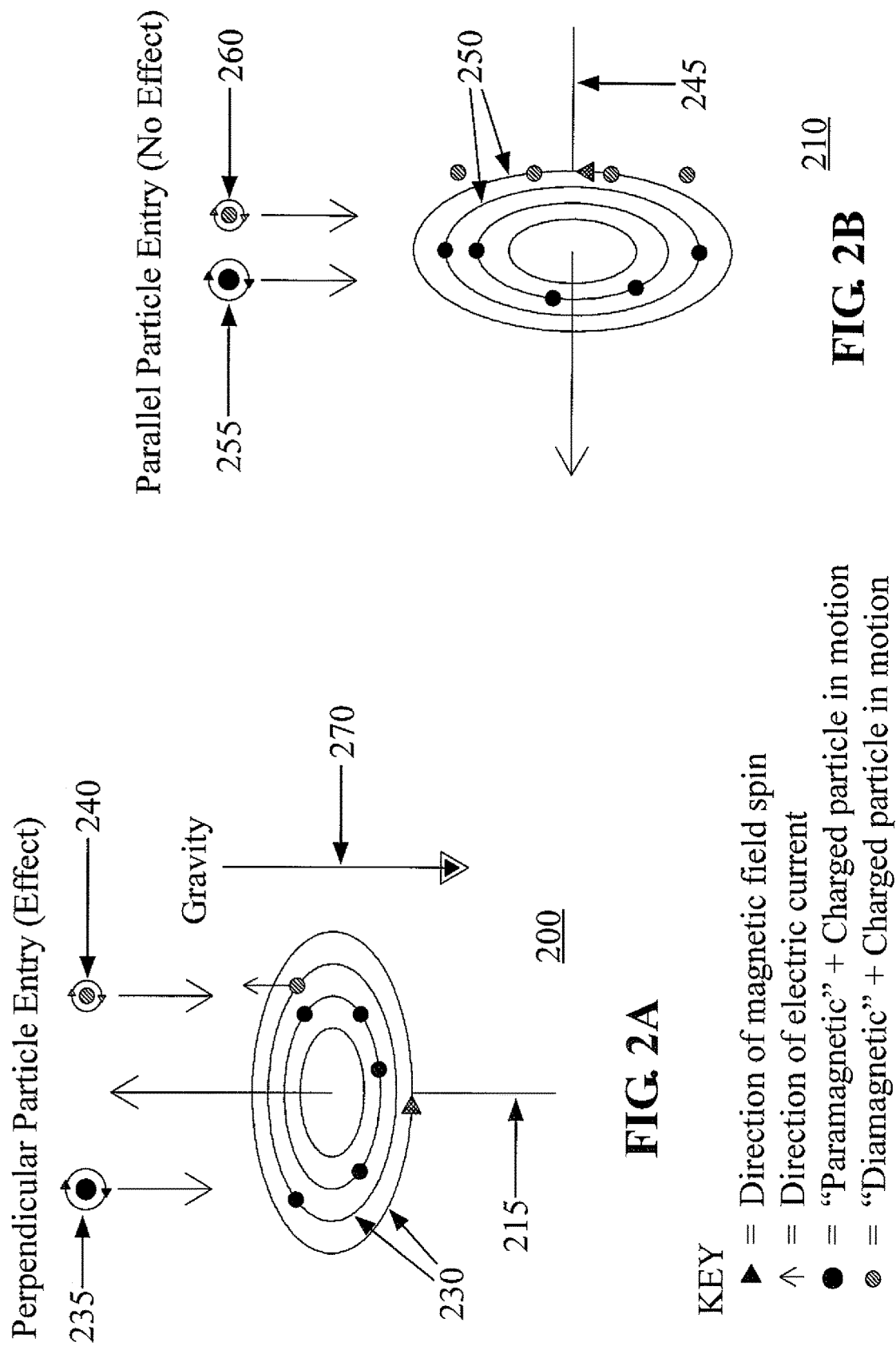

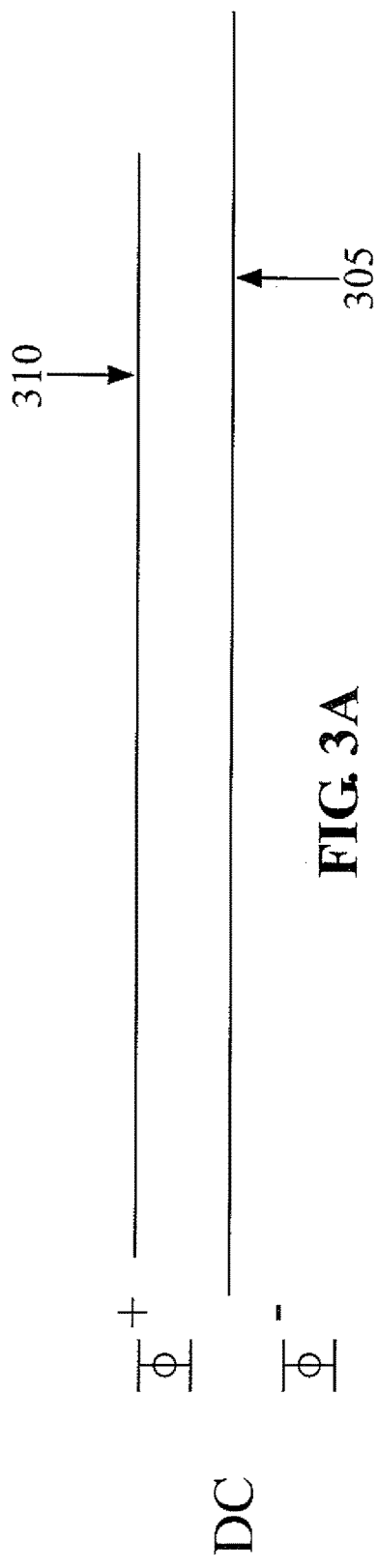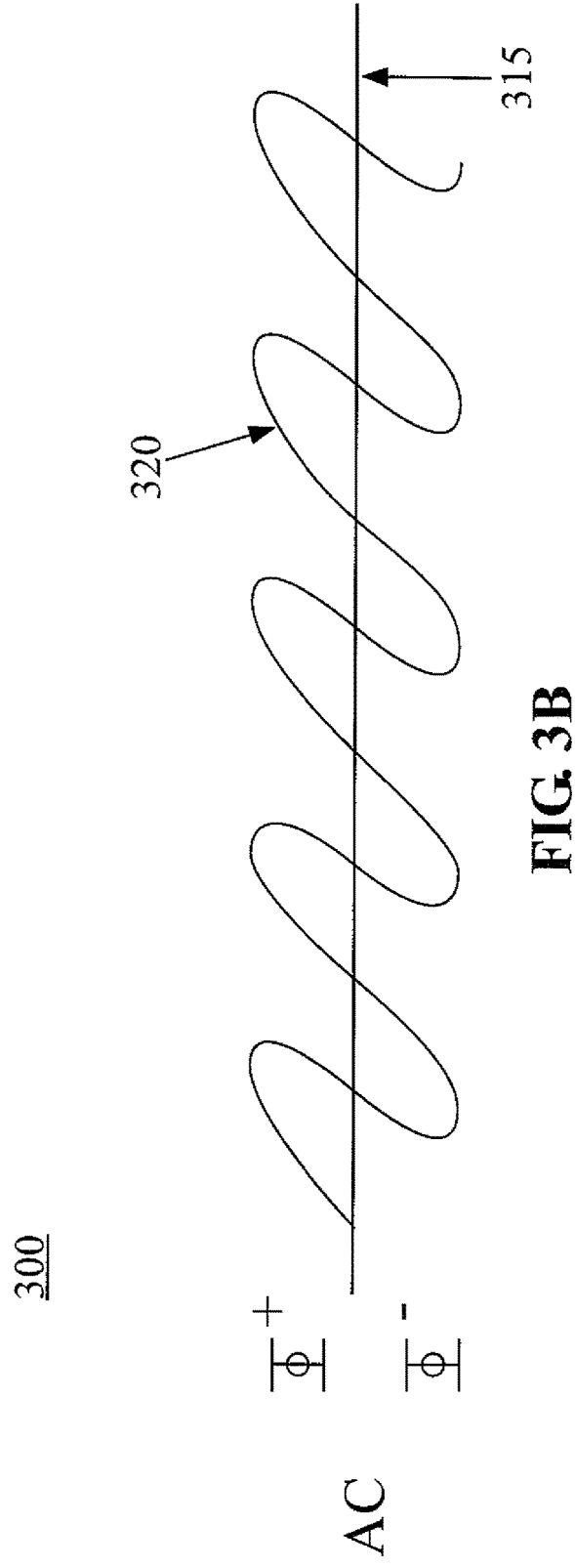

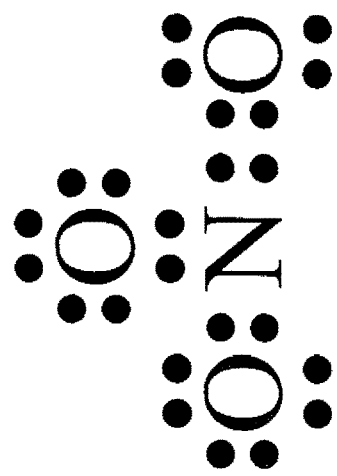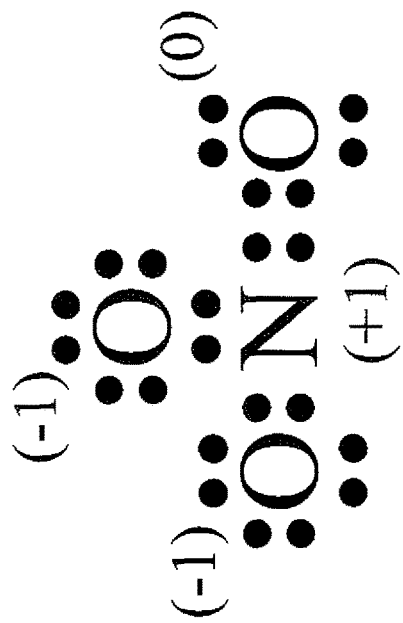
FIG. 4
400

← 1005
← 1010

Straight Line
Connectors:
Connect and
Disconnect

1015

Permanent Instillation:
Underground Loop
Connectors

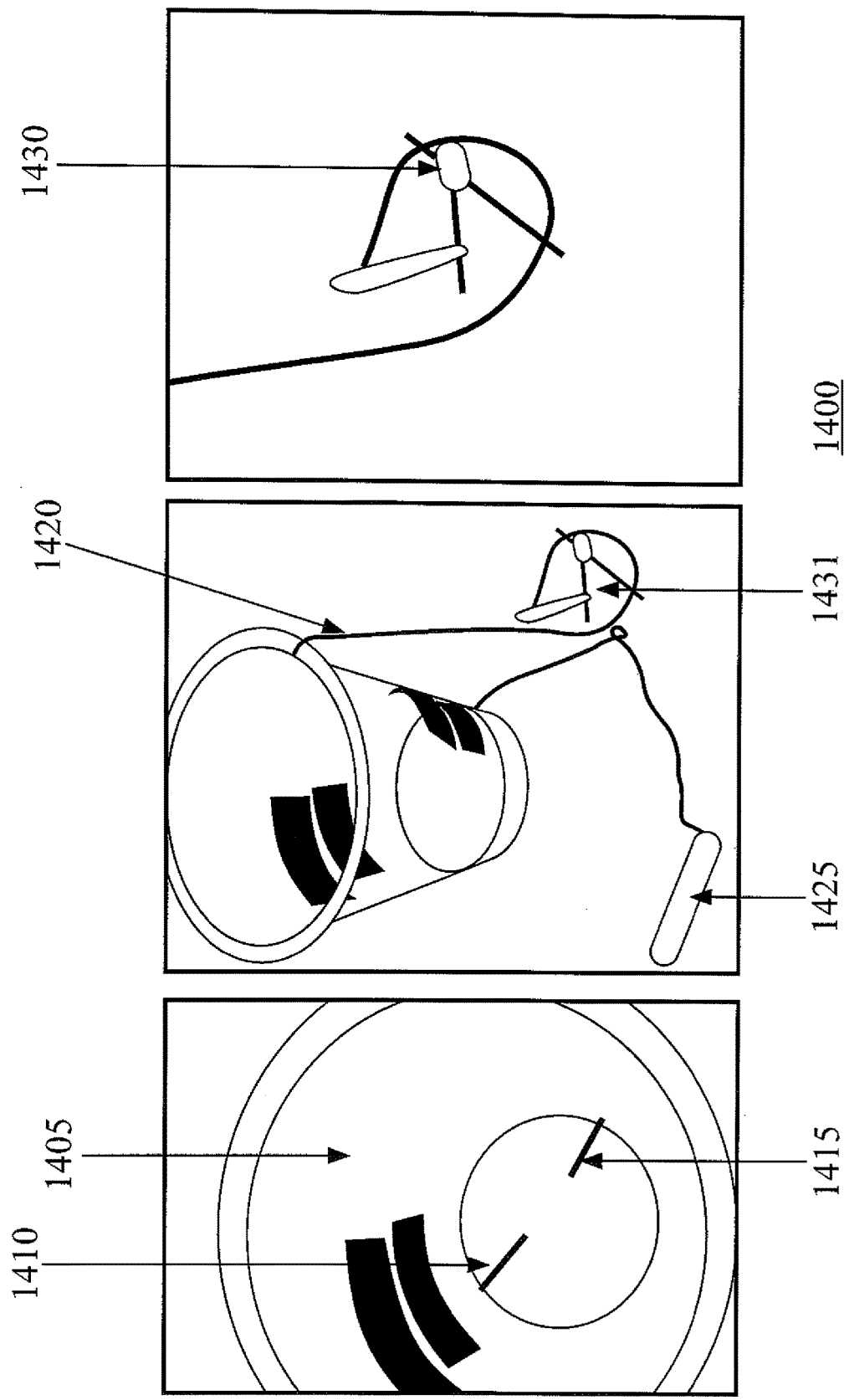

METHOD AND SYSTEM OF USING ELECTROMAGNETISM TO CONTROL FERTILIZER LEACHING

CLAIM OF PRIORITY

This application is a Continuation claiming priority to U.S. application Ser. No. 15/176,923 filed 8 Jun. 2016 (Now U.S. Pat. No. 9,707,568), which is a Continuation claiming priority to International Patent Application No. PCT/US2014/070094 filed 12 Dec. 12, 2014, which claims priority to U.S. Provisional Patent Application No. 61/915,967, filed 13 Dec. 2013, entitled "Method and System for Using Electromagnetism and Alternating Current to Control Fertilizer Leaching," Timothy James Rossi, inventor. These applications and patent are herein incorporated fully by reference.

BACKGROUND

Fertilizer leaching is a major problem for the agricultural industry, a headache for most growers, a challenge for fertilizer companies, and a serious concern to public health and the future of our environment.

BRIEF DESCRIPTION OF THE FIGURES

Aspects of this invention are described with reference to specific embodiments thereof. Other features of this invention can be appreciated with reference to the figures, in which:

FIGS. 1A and 1B depict illustrations of diamagnetism.

FIG. 1A depicts a superior oblique view of a magnet with a piece of diamagnetic material suspended above.

FIG. 1B depicts a side view of the magnet with the piece of diamagnetic material suspended above.

FIGS. 2A and 2B depict illustrations of a charged particle interacting with a direct current (DC).

FIG. 2A depicts perpendicular particle entry.

FIG. 2B depicts parallel particle entry.

FIGS. 3A and 3B depict diagrams illustrating differences between direct currents (DC, FIG. 3A) and alternating currents (AC, FIG. 3B).

FIG. 4 depicts the Lewis structure of the nitrate ion.

FIG. 5A depicts electrons without a magnetic field.

FIG. 5B depicts electrons exposed to magnetic field.

FIG. 9A depicts a side view of an array of devices producing perpendicular B field and parallel B field effects.

FIG. 9B depicts a detailed view of a portion of the device shown in FIG. 9A.

FIGS. 14A, 14B, and 14C depict results of an experiment to determine the conductivity of nitrate fertilizer.

FIG. 14A depicts apparatus to determine conductivity of nitrate fertilizer.

FIG. 14B depicts apparatus as shown in FIG. 14A with battery and LED light.

FIG. 14C depicts apparatus connected together showing light produced by the LED light.

SUMMARY

Figure 5B:
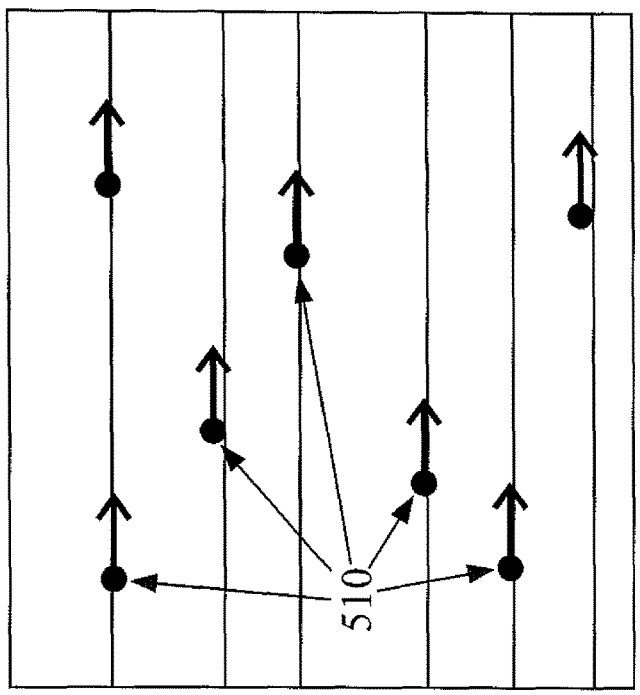
FIGS. 5A and 5B depict illustrations of paramagnetism.
Figure 5A:
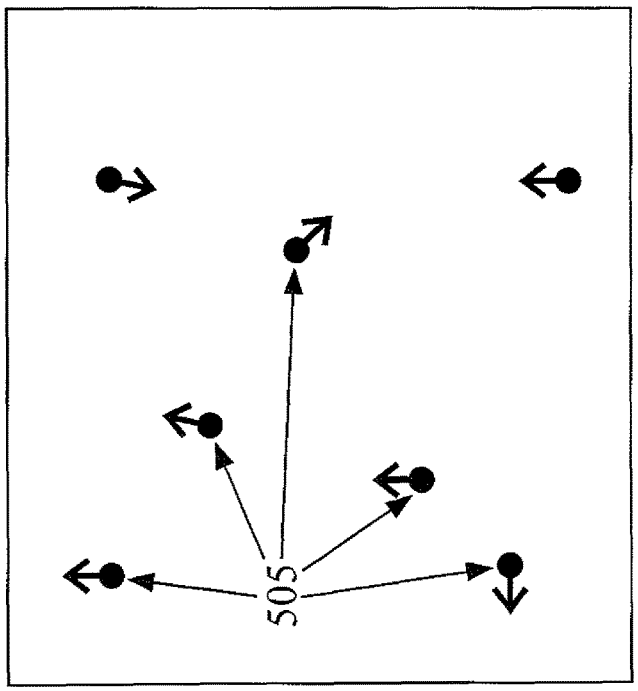

Nitrate, phosphate and sulfate are particular relevant. Nitrate and phosphate can be particularly difficult, with some ground water used for public drinking having nitrate concentrations of up to 2000 parts per million (ppm). As more agricultural lands are exploited, and as ground becomes progressively less fertile, there is a tendency to increase the use of exogenous fertilizers, including nitrate- and phosphate-based fertilizers. Such increased concentrations can lead to decreases in normal soil microbes, thereby decreasing nitrogen fixation, particularly by non-leguminous plants.

There is approximately 1 million tons of nitrogen fertilizer currently in the ground, and within about 10 to about 50 years, this may hit the groundwater and produce environmental and societal disruption. Additionally, by increasing extracting ground water, there can be salt intrusion into well water, and produce health problems.

Nearly every fertilizer element typically sold by industrial fertilizer producers has a charge associated with it, be it negative or positive (with the exception of urea, which is neutral).

Present formulations of certain liquid fertilizers, such as AN20, which contains both a negative and a positive charged nitrogen source, may partially stick to the soil within which it is deposited by a mechanism of cation exchange, without immediately leaching into the groundwater. Because organic matter and the clay particles in the soil are negatively charged, they serve as a natural reservoir to collect positively charged ions, but they can also contribute to leaching, as they naturally repel negative charges. Therefore, for all negatively charged fertilizer formulations entering the soil, this natural mechanism will not be effective and another mechanism is needed.

Embodiments according to the present invention utilize an electric current to produce a magnetic field, which will levitate or influence the motion of a negatively charged fertilizer.

Embodiments according to the present invention are designed to work with drip tape or sprinkler irrigation during the application of fertilizers to stop leaching of ions or ionic compounds such as nitrate into the environment where groundwater and other surroundings cold be contaminated, and achieving a pound for pound application of fertilizer to the targeted area. Embodiments according to the present invention include using electromagnetism to attract the fertilizer and suspend it within the soil beds.

Embodiments according to the present invention apply a magnetic or electric field to deflect fertilizers such as AN20, which contains a leach-able form of 10% Nitrate Nitrogen, away from the sinking irrigation water used when delivering the fertilizer, and into the surrounding soils. Embodiments according to the present invention include configuring the angle of entry of the fertilizer particles into the induced magnetic fields in a direction substantially transverse to the magnetic field. Embodiments according to the present invention configure the method of delivery and type of current, magnitude of current, voltage, ohms, and amps to achieve separation of the fertilizer from the irrigation water.

The benefits of the invention include: reduced levels of excess fertilizer into the groundwater and the environment by electromagnetically decreasing the downward movement of a negative charged species (e.g. nitrate, phosphate, and sulfate), less cost due to wastage, more efficient application of fertilizers to plants, easier compliance with regulatory policies, and a field installation that is easily manageable.

DETAILED DESCRIPTION

In the descriptions that follow, it is to be understood that the following terms are to mean:

The indefinite article "a" means one or more.

The term "comprising" means includes, but is not limited to.

The term "consisting of" means includes and is limited to.

The term "said" and "the" are the definite article.

Terms expressed in capital letters are to be considered the same as their equivalents expressed in lower case letter.

Introduction to Certain Physical Principles

Before describing certain aspects and embodiments, below is a brief review of selected principles of physics that apply.

1. Everything that has a mass has a gravitational field.
2. Everything that has a charge has an electric field.
3. Everything that has a charge and is put into motion has a magnetic field (B field).
4. Ampere's Law—whenever you have an electric current, you have a magnetic field that circulates around that current. With magnetic charges specifically pertaining to magnets: opposite poles attract and like poles repel.
5. With magnetic fields specifically created by an electric current: opposite poles repel and like poles attract.
6. The Department of Energy explains that when a magnetic material is cooled the electrons move slower, ordering the movement of the electrons and increasing the magnetism of a material. When a magnet is heated, the electrons circling the nucleus of a material increase in speed and exhibit chaotic movement. They lose their magnetism as the electrons fail to become ordered enough to attract another object.
7. Charges that move in magnetic fields always move in circles, but the magnetic field lines that are created by an electric current will always revolve moving charges perpendicular to the direction of the current.
8. The direction of the force exerted by a magnetic field on a moving charge is perpendicular to both the B field and the velocity.
9. A force that is perpendicular to the velocity of a particle can change the direction of the particle, but if the force were to run parallel to the velocity of a particle, it would have no effect on the particle.
10. A negative charge is attracted to a high electric potential, a positive charge is attracted to a low potential, and the unit of electric potential is the volt. Conversely, a low electric potential repels negative charges and a high potential repels positive charges.
11. FIGS. 2A and 2B depict interactions between a charged particle with a direct current. FIG. 2A depicts perpendicular particle entry. FIG. 2B depicts parallel particle entry. The particle is depicted coming into contact with a magnetic field, which is generated by a direct current (DC). Current is defined as the direction of the flow of positive charges, but in reality, it's the electrons that do the moving and therefore transport electrical charge . . . electrons move from the negatively charged object to the positively charged object . . . electrons, not positive charges, carry the current (Holzner, Steven, Physics II for Dummies, Indianapolis, Ind., Wiley Publishing, 2010, p. 44).
12. The electron is a speck of negative electricity that zips around inside of atoms and migrates along wires carrying electric current (Ford, Kenneth W, The Quantum World: Quantum Physics for Everyone, Cambridge, Mass., Harvard University Press, 2004, p. 2).
13. When something gets charged negatively, electrons are added to it. When it gets charged positively, electrons are taken away, leaving the protons where they are, and the net surplus of protons makes a positive charge (Holzner, p. 41).
14. There are two physical ways to charge a neutral object: by contact or by the process of induction. Charging by contact is fairly straight-forward and simple; you just touch the object with something charged and the object becomes charged. For example, a negatively charged rod is brought into contact with a ball that is originally neutral and the ball is left with a negative charge (Holzner, p. 41).
15. With induction, if you take a glass rod and some silk and rub the two together, a transfer of electrons from one material to the other occurs due to molecular forces between the two types of material. Different materials have different propensities to exchange electron. Now comes the clever part; you connect the far side of the object to the actual Earth, which acts as a huge reservoir of charge. The negative charges—the electrons—that are being forced to the far side of the object are frantic to get off of the object, because the charge on the rod is repelling them. By connecting the far side of the object to the ground with a wire, you provide those electrons with an escape route. And the electrons take that escape route by the millions and trillions (Holzner, pages 42, 43).
16. In the same way that electric charges create electric fields around them, north and south poles will set up magnetic fields around them . . . . With a typical bar magnet, for example, the field goes from the north pole to the south pole outside the magnet, and back from south to north inside the magnet.
17. The most important distinction between magnetic fields and electric fields: electric fields are created at positive charge, and they are destroyed at negative charge . . . it is not that way with magnetic fields. Magnetic fields don't ever stop or start anywhere. They always make closed loops.
18. Magnetic Fields generated by electrical currents can be produced by Alternating Currents (AC) or Direct Currents (DC), but there are differences and limitations between them.

ASPECTS OF THE INVENTION

The following are presented to provide general descriptions of aspects of the invention. It is to be understood that these aspects are not exclusive, and one or more of the following can be combined in a variety of ways within the skill of an ordinary person in the art.

A first aspect includes a device for producing a magnetic field within an agricultural bed, comprising:

an first insulated pipe segment having generally curved, closed side wall enclosing a space therein having a central axis, an open end, and a closed end;

said space having within it:

an electrically conductive first elongated element having a first end and a second end, a second elongated electrically conductive element having a first end and a second end;

each of said second ends within said space near said closed end being electrically connected to each other, forming an electrically conductive loop within said closed end, said first end of said first elongated element and said first end of said second element having electrically conductive portions extending through said open end of said pipe segment, said first elongated element and said second elongated element being separated within said space except for the electrically conductive loop;

said first end of said first conductive element adapted to be connected to an anode of source of electric power, said first end of said second conductive element being adapted to be connected to a cathode of said source of electric power.

Another aspect includes the any other aspect, further comprising:

an insulated straight line connector pipe segment having a generally curved closed side wall enclosing a space therein having a central axis and two ends, said sidewall having an opening therethrough, said space having a first and a second elongated conductive element therein generally parallel to said central axis;

said open end of said first insulated pipe segment of Claim 1 being sealingly attached to said insulated straight line connector pipe segment, said central axis of said first pipe segment being at an angle with respect to said central axis of said insulated straight line connector pipe segment, so that said first elongated pipe segment of Claim 1 becomes a vertical pipe segment, where the space of said vertical pipe segment is in continuity with said space of said straight line connector pipe segment, said first end of said first electrically conductive elongated element of said vertical pipe segment is electrically connected to a first conductive elongated element within said space of said insulated straight line connector pipe segment, said second end of said first electrically conductive elongated element of said vertical pipe segment being electrically connected to a second conductive elongated element with said insulated straight line connector pipe segment; and said first and second conductive elongated elements within said straight line connector pipe segment extending through said open ends of said straight line connector pipe segment.

A further aspect includes any of the other aspects, comprising a power source electrically connected to said first and second conductive elongated elements extending from said open ends of said straight line connector pipe segment.

An additional aspect includes any of the other aspects where said power source being an alternating current (AC) source.

A further aspect includes any of the above aspects where said power source being a direct current (DC) source.

A still further aspect includes any of the other aspects, comprising a plurality of vertical pipe segments attached to said straight line connector pipe segment.

An additional aspect includes any of the other aspects, where each of said vertical pipe segments having a length in the range of about 4 inches to about 36 inches, said vertical pipe segments are spaced apart on said straight line connector pipe segment with a spacing of about 6 inches to about 4 feet, thereby forming a linear array of vertical pipe segments attached to a straight line connector pipe segment, thereby producing a one-dimensional array of vertical pipe segments.

A still further aspect includes any of the other aspects, comprising a plurality of additional vertical pipe segments arranged generally in parallel to each other, each of said straight line connector pipe segments being electrically connected to each other in series with said power source, and having a lateral spacing in the range of about 12 inches to about 4 feet, thereby forming a two-dimensional array of vertical pipe segments.

An additional aspect includes a method for reducing leaching of an ionic fertilizer into ground water, comprising:

providing a device of any preceding aspect;

inserting said device into a bed of soil;

connecting said device to a source of electrical power; and causing an electrical current to flow through said loop, thereby producing a magnetic field with magnetic field lines generally oriented at right angles to said central axis of said device.

Another aspect includes any of the other aspects, where said method for reducing leaching of an ionic fertilizer into ground water, comprising:

providing a device of any other aspect;

inserting the vertical segments of said device into a bed of soil;

connecting said device to a source of electrical power; and causing an electrical current to flow through at least one of said plurality of loops, thereby producing at least one magnetic field with magnetic field lines generally oriented at right angles to said central axis of said at least one of said vertical pipes.

Another further aspect includes any of the other aspects, where said source of electrical power is an alternating current (AC) source, operating at:

a voltage of from about 1.0 Volt (V) to about 100 V, a frequency of from about 60 Hertz (Hz) to about 1 gigaHertz (GHz), and a power of from about $10^{-2}$ Amperes (A) to about 15 A.

A still additional aspect includes any of the other aspects, where the magnetic field strength of at least one of said plurality of magnetic fields is in the range of about $10^{-6}$ Tesla (T) to about 1.0 T.

Yet further aspects include any other aspect, where said magnetic field strength of at least one of said plurality of magnetic fields is measured using a Gauss meter.

Additionally, another aspect includes any other aspect, said Gauss meter comprising a generally planar sensor and detects the magnetic field strength above the surface of said bed.

Further aspects include any other aspect, said Gauss meter comprising a probe inserted into the bed of soil to measure magnetic field strength under the surface of said bed.

Still further aspects include any other aspect, said magnetic field strength being estimated at the surface of said bed of soil using a piece of non-conductive material having a later of black sand magnetite ($Fe_3O_4$) thereon.

Additional aspects include any other aspect, said ionic fertilizer selected from the group of nitrates, phosphates, and sulfates.

Still additional aspects include any other aspect, where said fertilizer is selected from the group consisting of ammonium thiosulfate (12-0-0-26 s), ammonium polyphosphate (10-34-0), urea ammonium nitrate (UAN 32), ammonium nitrate 20% (AN20), and calcium nitrate (CN9).

DESCRIPTION OF EMBODIMENTS

The net charge of a diamagnetic or paramagnetic molecule (positive or negative) is influenced by and against an electric current, when wires carrying an alternating current (AC) are oriented appropriately, so as to produce a series of alternating current magnetic fields. The AC design is configured to hold the position or reduce the leaching rate of a moving charge within an induced magnetic field, by exposing the moving charge (or molecule) to changing attractive and repulsive oscillating fields. In addition, it is postulated that the net charge of a diamagnetic or paramagnetic charge (positive or negative) is influenced by an electric current, where wires carrying a direct current are oriented appropriately, so as to produce a series of direct current magnetic fields. The DC design is configured to cause a net movement of charged particles in a given direction, as a result of a constant force in a given direction, to reduce the leaching rate or hold the charge (or molecule) in a position, located within the applied magnetic field.

FIGS. 1A and 1B show illustrations 100 of diamagnetism. FIG. 1A depicts a superior oblique view of a magnet with a piece of diamagnetic material suspended above. FIG. 1B depicts a side view of the magnet with the piece of diamagnetic material suspended above. Diamagnetism is due to currents induced in atomic orbitals by an applied magnetic field. The induced currents produce a magnetization with the diamagnetic material that opposes the applied field, and the magnetism disappears when the applied field is removed. Several elements listed on the periodic table are ferromagnetic, paramagnetic, diamagnetic, or anti-ferromagnetic. FIGS. 1A and 1B illustrate levitation of a piece of graphite over a magnetic field. Top portion (FIG. 1A) is a superior oblique view, and the bottom portion (FIG. 1B) is a side view of apparatus demonstrating diamagnetism, showing magnet 105 and a piece of graphite 110.

FIGS. 2A and 2B depict illustration 200 and 210 of forces acting on a charged particle in an electric field. Left side of FIG. 2 (FIG. 2A) depicts perpendicular particle entry: effect 200, and the right side of FIG. 2 (FIG. 2B) depicts parallel particle entry: no effect 210. A force that is perpendicular to the velocity of a particle can change the direction of the particle, but if the force were to run parallel to the velocity of a particle, it would have no effect on the particle. On the left side of FIG. 2 (FIG. 2A), direction of current 215 generates a series of magnetic field lines 230. Paramagnetic particle 235 and diamagnetic particle 240 are shown being influenced by magnetic field 230. On the right side of FIG. 2 (FIG. 2B), electrical current 245 produces magnetic field lines 250. Paramagnetic particle 255 and diamagnetic particle 260 are not affected by magnetic field 250.

FIGS. 3A and 3B depict an illustration 300 of a direct current (DC) magnetic field (top portion; FIG. 3A) oriented appropriately would be more likely (than AC, FIG. 3B) to cause a net movement of charged particles in a given direction as a result of a constant force in a given direction. Reference voltage 305 and direct current 310 are shown. Bottom portion of FIG. 3 (FIG. 3B) depicts a reference voltage 315 (i.e., 0 Volts) and an alternating current 320. Electric fields cause a more straightforward attraction or repulsion of the charge . . . a properly oriented DC electric field may do that for certain sized particles (see Millikan's oil drop experiment), but it will tend to select charged particles on masses of certain sizes . . . a charge moving through a magnetic field will experience a force (Dr. Daniel Fernandez, PhD Physics). In the days of Nikola Tesla it was known that a direct current, which doesn't alternate, could travel only a short distance before the resistance of the wires overcame the current (Holzner, page 87), so back then, it was almost impossible to try and use DC to control nitrate leaching on long beds. However, with the modern development of a thyristor circuit, DC can now be used to achieve a longer run of electricity without power loss (Dr. Daniel Fernandez, PhD Physics). A thyristor circuit can covert from one DC voltage to another and give you the corresponding step down in current (Dr. Daniel Fernandez, PhD Physics).

The water will move the charged particle (nitrate) downward and how that will affect its soil penetration is interesting. When you have a charge moving downward, the force that this charge will experience, is given by the Lorenz Formula (qv×B). Newton's first law says that an object in motion remains in motion, unless something acts on it. The faster the charge moves the less strong magnetic field you would need to deflect the charge. If the charge has a bigger initial velocity, it's going to go in a much bigger circle. If you have a more massive particle, you're going to have a much bigger circle. It is harder to stop a bigger particle. The smaller the charge, then the bigger the radius will be. A bigger charge is going to feel more force (Dr. Daniel Fernandez, PhD Physics). Therefore, a small charge such as nitrate (with a charge of −1) or other negatively charged ions or ionic compounds, can be deflected or influenced to stop leaching downward through the soil by using magnetic fields, generated by an adequate DC frequency.

Alternating Currents (AC), governed by a transformer, can change direction in a timed interval, which can yield two different directions on a moving charge. "Alternating Voltages . . . means that the voltage in any wire changes from positive to negative and then back again regularly" (Holzner, page 87). Even though it may be easier to achieve polarity control with DC, it is postulated that nitrate (negative charge) could be both repelled and attracted by AC (James Robertson, RH20 Engineering). Furthermore, alternating current can travel much farther with no problem (it actually helps regenerate itself through alternating magnetic and electric fields). That's why power lines carry alternating current (Holzner, page 87). Due to the fact that an AC magnetic field moves quickly in two directions (back and forth), it is an interesting approach to study the relationship it may have with moving charges. When the current switches direction, it actually creates a propagating wave (a radio wave) that propagates outward (Dr. Daniel Fernandez, PhD Physics).

Furthermore, according to the Debye-Falkenhagen theory, when the time for one oscillation of an external alternating field is larger compared with the relaxation time of the ionic atmosphere, the latter will be in its asymmetric state, causing a retarding effect on the ion motion (Chighladze, Giorgi, Estimation of change in soil water nitrate-nitrogen concentration using impedance spectra, Iowa State University, IA: ProQuest LLC, 2011, page 21).

In addition, at characteristic frequencies, the relaxation effect can totally disappear due to inability of ionic atmosphere to reach the asymmetric state. At these frequencies, the velocity of ions and their individual conductivities are significantly higher than ordinary frequencies. As a result contribution to the total ionic conductivity of the ion species, hence, their transportation number will change with frequency of the applied electric field (Chighladze, pages 21, 22). Interestingly, it has been estimated that the characteristic frequency of nitrate should be in the vicinity of 5 MHz. At 5 MHz, its movement is still retarded by an asymmetric ionic atmosphere (Chighladze, page 55). Although magnetic forces are a little trickier than electric fields, the same statistical effects should apply, and the magnetic fields and radio waves coming from an electric current can be involved in the parameters for the control of a moving charge. Therefore, an AC current, with the proper frequency of amps, volts, ohms (resistance), and frequency of radio waves (Hertz), is postulated to deflect or hold the downward movement of nitrate in the soil.

The Earth's magnetic field is maintained by the swirling motion of molten iron deep inside the Earth (Holzner, page 64), affecting every element on the planet to some degree. In addition, the Earth's magnetic field is only between 30 and 60 micro Tesla (µT means millionths of a Tesla), 30 µT at the equator and 60 µT at the poles. It is stronger at the poles because that is where all of the field lines are coming together. These considerations should be taken into account when configuring the proper power level needed to influence ions or other ionic compounds such as nitrate.

Furthermore, the movement of water through the soil must also be addressed, because different soil types (e.g., sand, silt, and clay) can cause changes in the velocity of water and the forces they impose on fertilizer particles, which may widen the range of the power level needed. In order to control the leaching of fertilizer, the forces exerted by gravity and moving water must be overcome by the forces induced by the application of electromagnetism.

FIG. 4 depicts the Lewis structure 400 of the nitrate ion. Nitrogen has 5 valence electrons, oxygen has 6, and we have 3 oxygen's, and we need to add 1, which gives us a total of 24 valence electrons. Nitrogen is the least electronegative; we can see that each of the oxygen's has 8 valence electrons, but nitrogen only has 6 valence electrons. The characterization of a molecule formed by nitrogen and oxygen, such as nitrate, as diamagnetic or paramagnetic can be characterized by methods known in the art.

All of the electrons are spin-paired in diamagnetic elements so their subshells are completed, causing them to be unaffected by magnetic fields. Conversely, paramagnetic elements are strongly affected by magnetic fields because their subshells are not completely filled with electrons. Nitrogen is a diamagnetic element, and oxygen is a paramagnetic element. Magnetic influence also depends upon the permeability of magnetic fields on a molecule or element.

One form of control to stop a paramagnetic molecule from leaching is based on charge control, which would stem from the attraction of electrons to a high energy potential (i.e., voltage). When a paramagnetic element enters a strong magnetic field, the electrons align with the magnetic field lines, to give a secondary form of control. FIGS. 5A and 5B depict an illustration 500 of this phenomenon. On the left side 500 of FIG. 5 (FIG. 5A), in the absence of a magnetic field, electrons, shown as black dots 505, are not aligned (arrows are shown with random orientation). In contrast, as shown in the right side 501 of FIG. 5 (FIG. 5B), in a magnetic field, in the presence of an electric field, electrons 510 are aligned with the field.

Therefore, one purpose of the present invention is to separate ions or ionic compounds, such as nitrate, phosphate, sulfate or other fertilizers during the application of a fertilizer from the water that carries the fertilizer downward and allow the fertilizer enough time to attach itself to the films of water on the soil colloid (i.e. soil moisture).

In an embodiment, the male plugs and female copper connectors interconnect and snap into place after applying pressure against the flexible connectors (such as the rubber flex fits) at each end of the straight line connector pipes.

In an embodiment, vertically directed conductive wires descend from the straight line connector pipe in vertical pipe segments below the ground surface. In an embodiment, the vertical pipe segments descend 10 inches, although alternative embodiments contemplate other depths, such as 8 inches. in additional embodiments, the depth could be from about 4 inches to about 36 inches, in other embodiments from about 6 inches to about 24 inches, alternatively from about 8 inches to about 16 inches, or from about 10 inches to about 14 inches.

In an embodiment, conductive wires inside the vertical pipe segments descend to the bottom of the vertical pipe segment, then turn and ascend to the level of the Straight Line Connector pipes, forming vertical wire loops. Once at the level of the Straight Line Connector pipes, the conductive wires continue horizontally along the length of the Straight Line Connectors.

In an embodiment, the conductor wires within the vertical pipe segments are supported and held securely with support plugs; these plugs also help ensure the conductive wires do not electrically short together. In an embodiment, the conductive wire is formed of 10 gauge iron wire and the support plugs are formed from high-density plastic. Alternative embodiments contemplate the use of other conductive materials and diameters to form the conductive wires and other high-density non-conductive materials to form the support plugs.

In an embodiment, the vertical pipe segment is a moisture impermeable pipe and is permanently affixed to the Straight Line Connector pipe. In an embodiment, the moisture impermeable pipe is formed of 2 inch PVC pipe and the permanent fixation is formed by gluing with ABS glue. Alternative embodiments contemplate the use of other moisture-impermeable materials of different diameters for the pipe, and the use of alternative moisture-resistant fixations such as bonding, welding, or bolting.

In an embodiment, the vertical pipe segments are spaced along a Straight Line Connector with a spacing distance of 6 inches. Alternative embodiments contemplate using a spacing distance of 24 inches, or other distances dependant on the strength of the induced magnetic fields surrounding the vertical pipe segments. In other embodiments, spacing can be from about 6 inches to about 4 feet, in other embodiments, from about 8 inches to about 36 inches, in further embodiments, from about 12 inches to about 24 inches, and in additional embodiments, from about 16 inches to about 20 inches.

In an embodiment, the vertical pipe segments containing the embedded conductive wires are positioned and submerged beneath the soil with the gentle use of a rubber hammer, by tapping on top of the vertical pipe segment. In an embodiment, the top of the vertical pipe segment comprises a stopper that rests above the vertical pipe segment lead.

In certain embodiments, straight pipes can be spaced apart at as distance between about 12 inches to about 4 feet, in other embodiments from about 16 inches to about 36 inches, in further embodiments from about 20 inches to about 24 inches.

In an embodiment, the vertical wires are wrapped with copper wire. In a further embodiment, the copper wire is formed of 12 gauge wire, although other diameters are contemplated that induce the required magnetic field.

In an embodiment, an anti-oxidant coating such as Noalox® is applied to all conductive wires.

To measure the intensity of a magnetic field underground, one can use a Gauss meter. A Gauss meter can be used above ground to provide an estimate of magnetic field strength. In other embodiments, a probe can be attached to a Gauss meter and the probe inserted into the ground to measure magnetic field strength beneath the surface. Such probes can be used to measure field strength within the root zone of the plants in the bed.

Magnetic field strengths in the root zone can be in the range of about $10^{-6}$ Telsa (T) to about 1 T, alternatively from about $10^{-5}$ T to about $10^{-1}$ T, alternatively from about $10^{-4}$ T to about $5\times10^{-2}$ T, still alternatively from about $10^{-3}$ T to about $10^{-2}$ T.

Alternatively, magnetic field strength can be estimated by use of a piece of cardboard on the top of a magnet and apply a layer of black sand magnetite ($Fe_3O_4$). In the presence of a magnetic field, the magnetite will follow the lines of magnetic force and produce a visual indication of relative magnetic field strength.

In certain embodiments AC frequencies can be within the range of about 60 Hz to about 1 gigaHertz (GHz), alternatively about 600 Hz to about 100 megaHertz (MHz), alternatively about 5 MHz to about 50 MHz, alternatively. For nitrate, the frequency can be at about 50 MHz, for phosphate and sulfate, it can be in the range of about 50 MHz to about 1 GHz.

Voltage applied to a system can be in the range of about 1.0 V to about 100 V, alternatively from about 2 V to about 50 V, alternatively from about 5 V to about 30 V, alternatively form about 10 V to about 20 V.

A power supply can be regulated so that the power delivered can be in the range of from about $10^{-2}$ A to about 15 A, alternatively form about $10^{-1}$ A to about 10 A, in other embodiments from about $5\times10^{-1}$ A to about 5 A, alternatively from about 1 A to about 2 A.

EXAMPLES

The follow examples illustrate some specific embodiments, and are not intended to limit the scope of the invention. Rather, persons of skill in the art can produce other embodiments without undue experimentation and with a likelihood of success. All such embodiments are considered to be within the scope of this invention.

Example 1: Cylindrical Conductor

Figure 6:
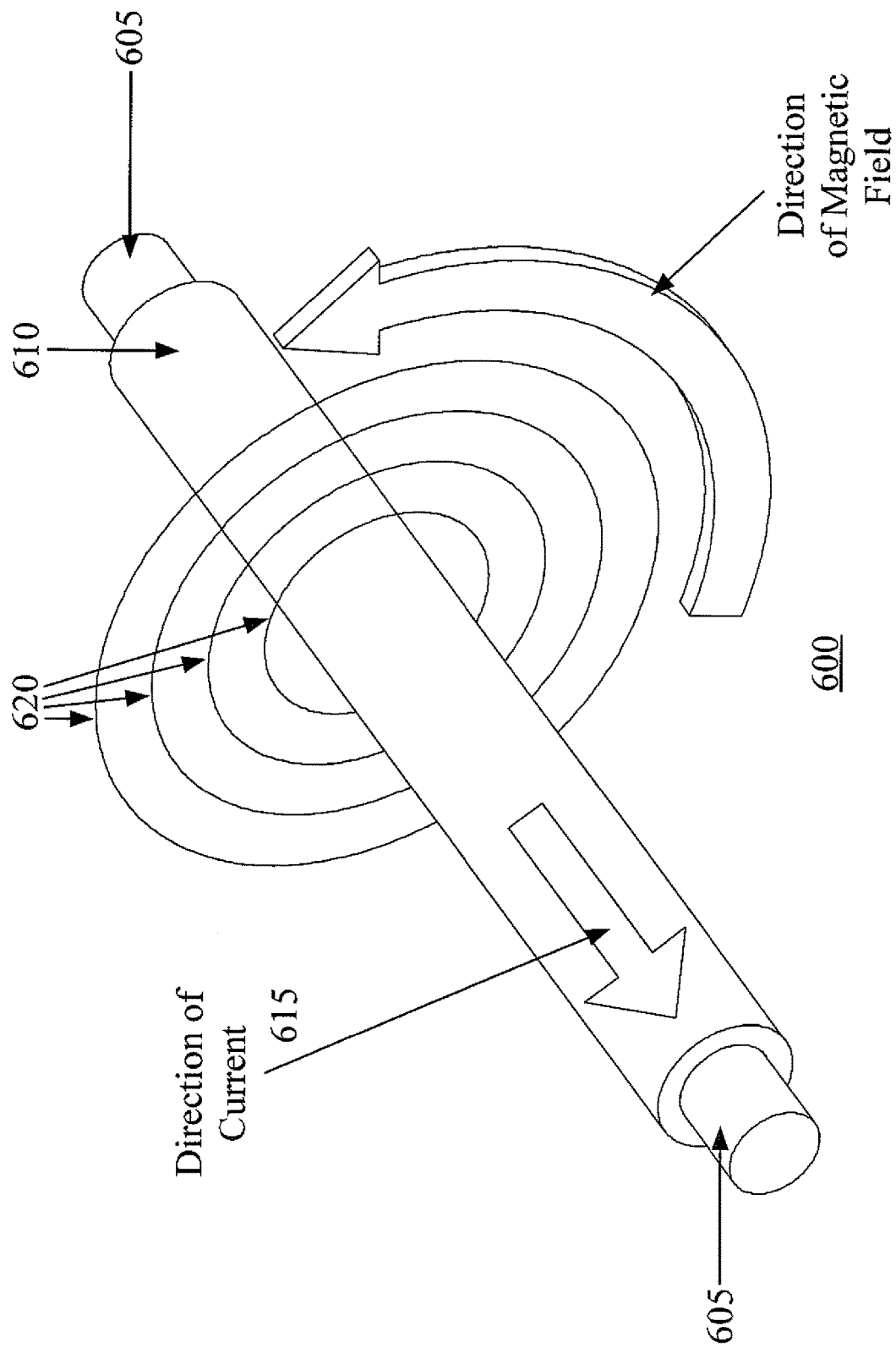
FIG. 6 depicts an embodiment of a design to stop nitrate leaching.

FIG. 6 depicts an embodiment of a device 600 for creating a magnetic field using electric current through a conductor. Cylindrical conductor (inner column) 605 is surrounded by insulator 610. Electric current 615 flows through conductor 605, producing circumferential magnetic field lines 620 induced by current 615.

Example 2: Toroidal Conductor

Figure 7:
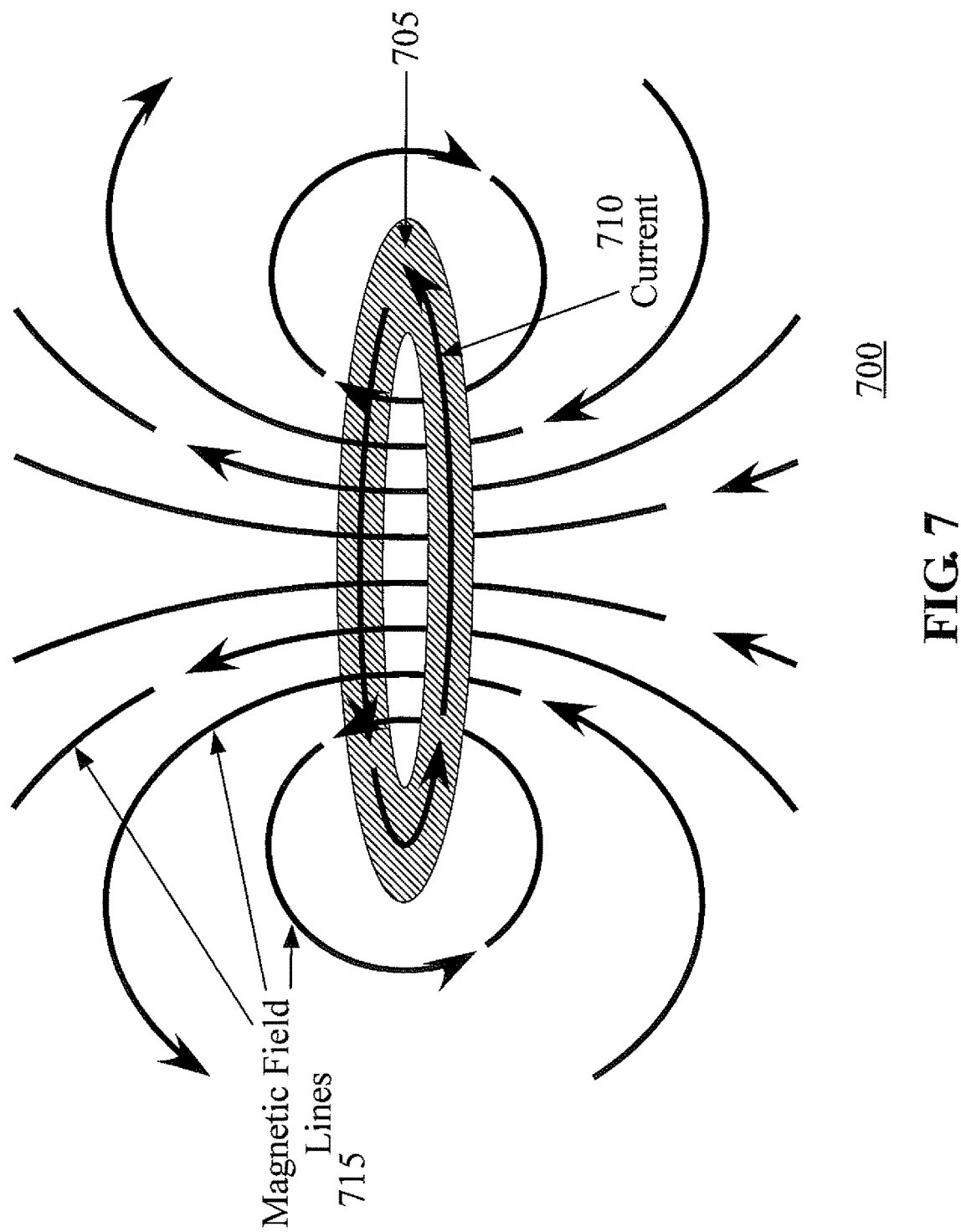
FIG. 7 depicts an alternate embodiment of a design to stop nitrate leaching.

FIG. 7 depicts an alternative embodiment 700 in which conductive material 705 is in the form of a torus (doughnut). Electric current 710 flows through conductor 705, producing magnetic field lines 715 induced by current 705.

As shown in FIG. 7, a vertical center line represents a vertical conductor placed within a moisture impermeable pipe, carrying an electromagnetic current. The elliptical lines represent the direction of the magnetic field lines and the force on ions or ionic compounds, such as nitrate, during the application of fertilizer delivered within the pipe.

In an embodiment, the vertical conductor is formed of 10 gauge iron wire and the pipe is formed of one-inch PVC pipe. In alternative embodiments, the design may include other conductive materials and may be different in diameter, and pipes may include alternative moisture impermeable materials and diameters, such as a rubber hose casing to replace the PVC.

Electric charges in motion form a current, and various arrangements of electric current create different magnetic fields (Holzner page 11). Alternate embodiments comprise bent wires having different shapes (doughnuts, vertical or horizontal loops, side by side lines with the same direction, side by side lines in the opposite direction, etc), since these configurations may create different magnetic force directions and different power levels by doubling them up.

A magnetic field, which is measured in Gausses or Tesla units (Holzner, page 66), wraps around the center of the wire in circular loops, decreasing in magnitude with increasing distance from the wire (Boston University, Magnetic Fields and how to make them).

A further embodiment comprises wrapping iron wire with coils of copper wire, which may result in creating a strong electromagnet. Moreover, since magnetism is stronger when a magnet is cooled at low temperatures, alternative embodiments comprise cooling down the soil or simply using cold water temperatures from about 0° C. to about 10° C. to strengthen the magnetic forces.

Example 3: Implementation in a 40" Bed

On an average 40" bed volume of soil, about 260 square inches are available to work with when determining field placement and flux. Magnetic flux is magnetic field times the area, so it consists of two pieces, the size of the magnetic field and the size of the area in which it is acting.

Figure 8:
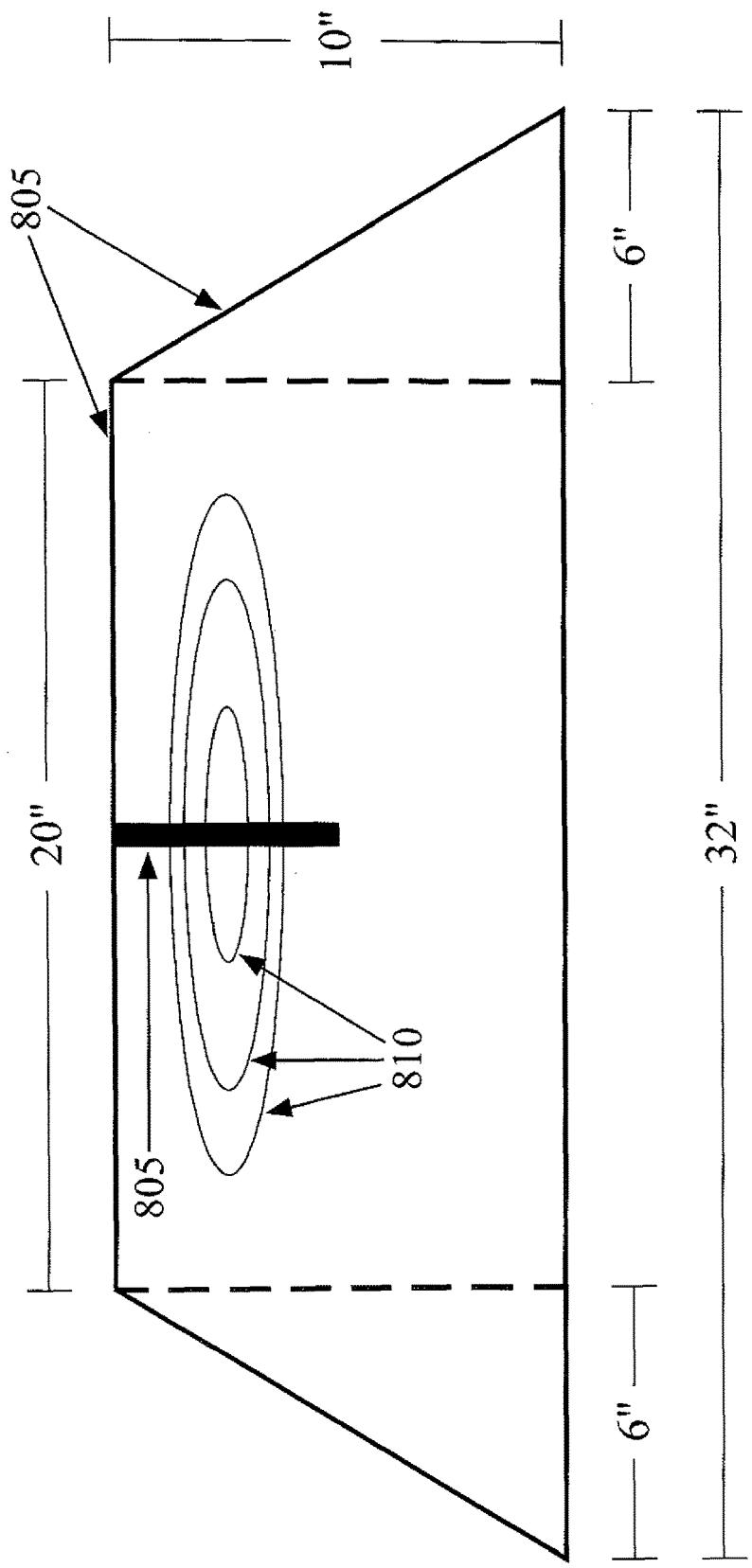
FIG. 8 depicts a cross section of a standard 40" planting bed.

FIG. 8 illustrates an embodiment 800 according to the present invention on a 40" bed. This embodiment comprises using electrically conductive wire 805. In an embodiment, conductive wire 805 (represented by the vertical and horizontal straight lines and vertical hashed lines), are run through a moisture impermeable pipe (not shown) Electrical current flowing through the conductive wire 805 produces magnetic field lines 810. The conductive wire 805 is insulated by PVC pipe or hose for field safety and to avoid a short circuit (since conductive wires cannot have direct contact with irrigation water). There are 4 inches that are not shown on each side of the trapezoid depicted in FIG. 8, and represents the center of the furrow and factors into the measurements of a 40" bed.

Example 4: Installation with Moisture Impermeable Pipes and Loops

Figure 9A:
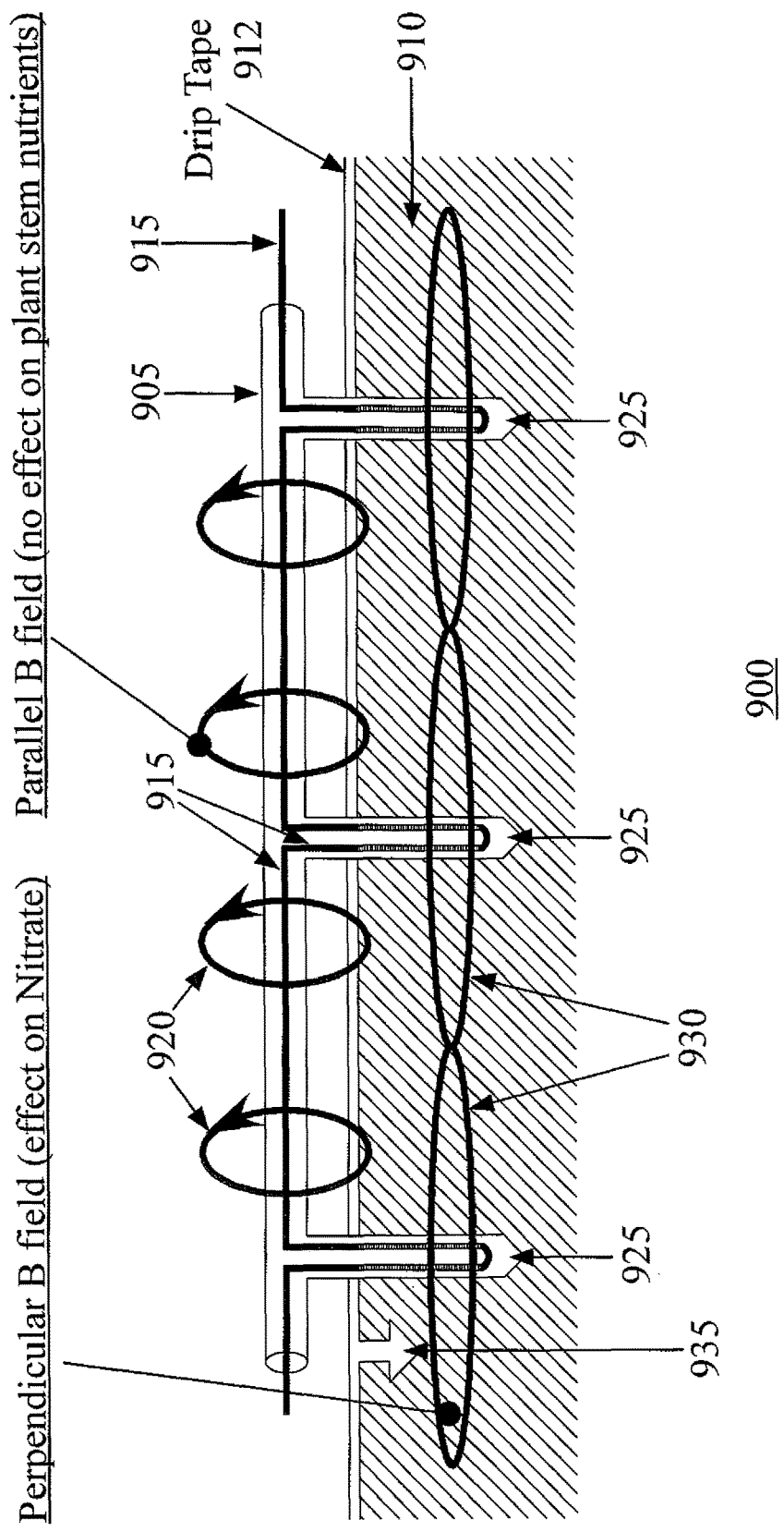
FIGS. 9A and 9B depict embodiments of an electromagnetic containment design.

FIG. 9A depicts an embodiment 900, having horizontal straight pipe segments 905 (Straight Line Connectors, defined below), arranged above bed 910. Conductive wire 915 within the horizontal pipe segments 905 is formed of 10 gauge iron wire, and the moisture impermeable pipe segments 905 are formed of one inch PVC pipe. Electrical current running through conductive wire 915 produces magnetic field lines 920 both in the horizontal wire and in wires descending into vertical PVC pipe segments 925. Electrical current running through vertical PVC pipe segments 925 produces magnetic field lines 930 within bed 910. In alternative embodiments, conductive materials may include aluminum and may be different diameter, and pipes may include alternative moisture impermeable materials and diameters.

Figure 9B:
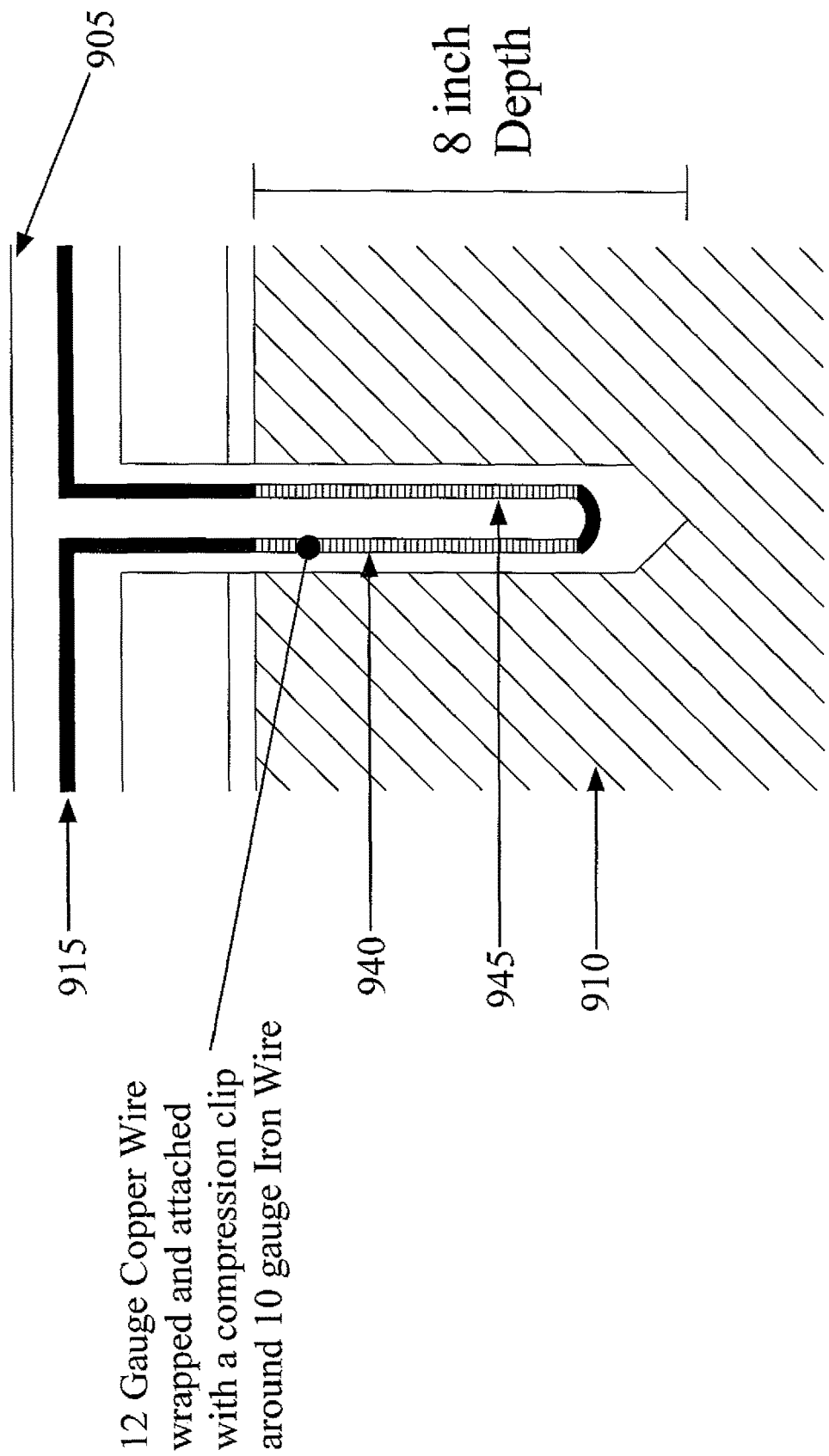

FIG. 9B depicts a blow-up view of vertical PVC pipe segment 925, showing horizontal PVC pipe segment 905, conductive wire 915, descending conductive wire 930 and ascending conductive wire 935.

FIG. 9A also shows permanent installations of moisture-impermeable pipe at the ends of the field, which travel beneath the furrow and then rise to the bed top where they can be connected with connectors (Underground Loop Connectors) to Straight Line Connectors (defined below). In an embodiment, the pipe is formed of one inch PVC pipe and the depth beneath the furrow is below a 14" sub-furrow line (see Diagram X). Alternative embodiments contemplate the use of other moisture-impermeable materials and diameters, and other depths beneath the furrow.

Connected to horizontal straight pipe segments 905 are shown three vertical pipe segments 925, inserted into bed 910 and comprising vertical moisture-impermeable pipes that contain vertically descending 930 and ascending 935 conductive wire (vertical loops, defined below). In the vertical wire loops, the vertical, the portions of descending conductive wire 930 and ascending conductive wire 935 that are located under the top surface of bed 910 represent areas where iron wire is wrapped with copper wire to increase the size of the magnetic field, which increases the distance between the vertical wire loops and decreases the number of vertical wire loops needed. Also shown is drip tape 940.

The conductive wire in the vertical wire loops is chosen to safely conduct 10 amps of current while managing the amount of heat generated. An embodiment uses 10 gauge iron and 12 gauge copper wire, although alternative embodiments are contemplated due to differences in types of soil: different power levels are needed. Managing heat during conduction is desirable to minimize condensation (i.e., sweating) within the pipe.

A further embodiment may add a coating to protect the iron and copper wires from oxidation, such as by thoroughly applying an anti-oxidant such as "Noalox®" to all iron and copper surfaces.

To keep the above ground magnetic fields small, an embodiment according to the present invention comprises not wrapping copper wire around the horizontal wire and any portion of the wire that is above ground.

Example 5: Large Scale Implementation

Figure 10A:
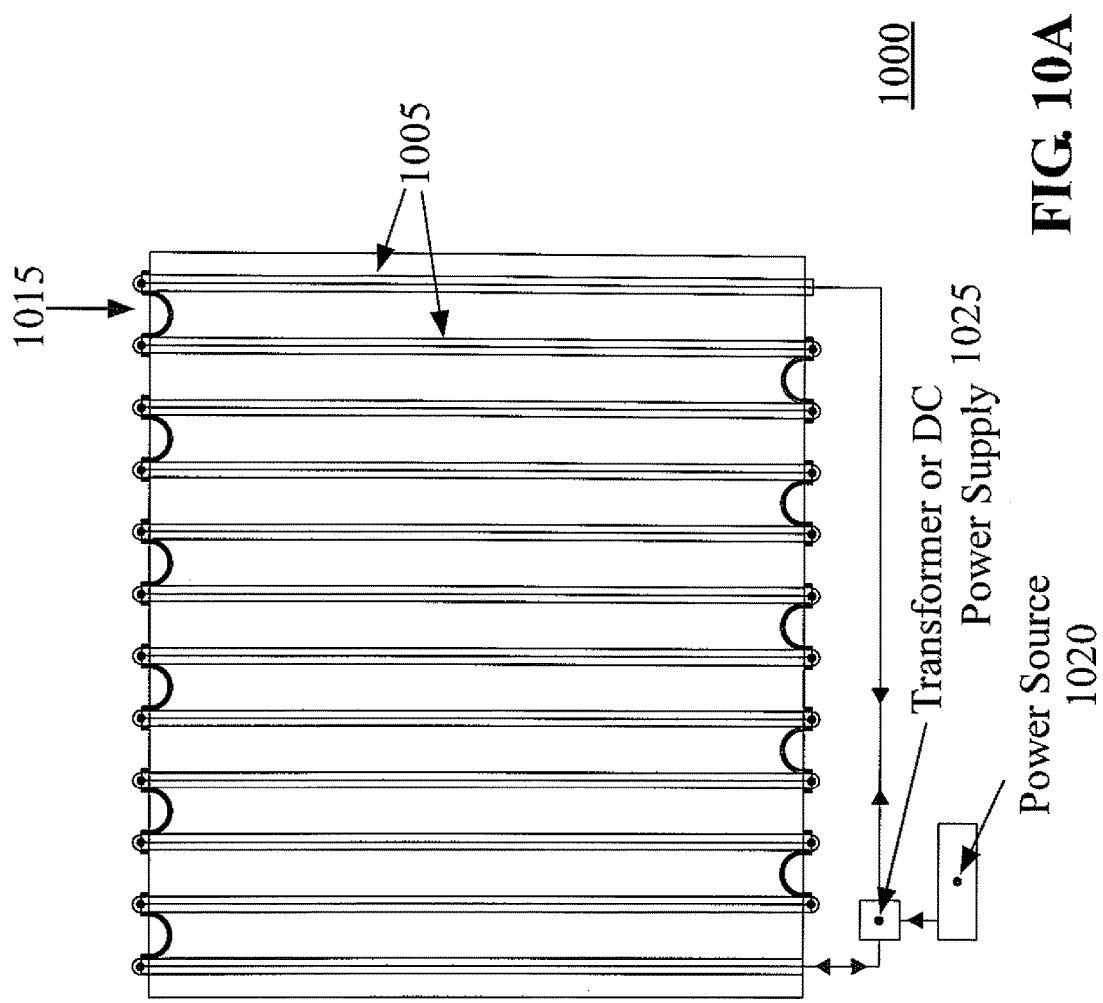
FIG. 10A depicts an aerial view of an embodiment of underground loop connectors and straight line connectors on a one acre field set-up on 12 beds and showing a source of electric current.
Figure 10C:
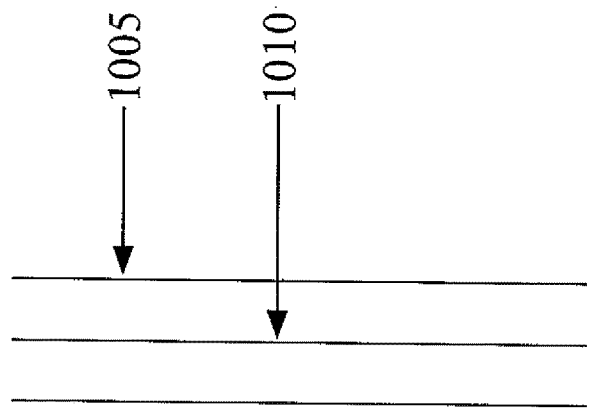
FIG. 10C depicts an enlarged view of a straight line connector shown in FIG. 10A.
Figure 10B:
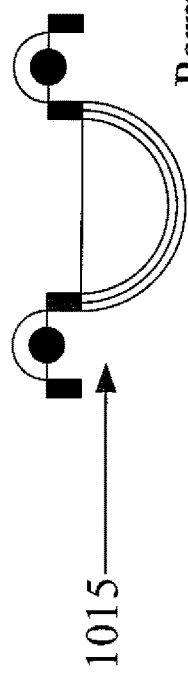
FIG. 10B depicts an enlarged view of an underground loop connector shown in FIG. 10A.

FIGS. 10A, 10B, and 10C depict aerial views of an embodiment 1000 of underground loop connectors and straight line pipes 1005 on a one acre field set-up on 12 beds. Straight line pipes 1005 are shown having conductors 1010, underground loop connectors 1015, power source 1020, and a transformer 1025. FIG. 10B depicts an enlarged view of an underground loop connector shown in FIG. 10A. FIG. 10C depicts an enlarged view of a straight line connector shown in FIG. 10A.

Power source 1020 produces 10 amps (A) of electric current, which passes through conductive wire 1010, such as 10 gauge iron wire without copper. Another embodiment induces 10 amps of electricity through iron wire wrapped with copper. Further alternative embodiments may induce a range of currents below 10 amps, such as between 5 A and 10 A, because copper wires reduces the power needed, or or increases the size of the magnetic field. In alternative embodiments, the conductive wire may be different diameter, of from 1 gauge to 20 gauge, 2 gauge to 15 gauge, 5 gauge to 10 gauge.

In an alternative embodiment, stacking or aligning adjacent magnetic fields next to each other will further increase the size of the magnetic field, thereby producing a bigger field to encompass the fertilizer.

Another alternative embodiment comprises Radio Frequency (RF) shielding of the horizontal wire, to reduce the size of the magnetic field above the ground level. Another alternative embodiment comprises triangulating 3 wires and positioning them close to each other, so that the cancel out the magnetic fields.

Example 6: Large Scale Implementation II

Figure 11:
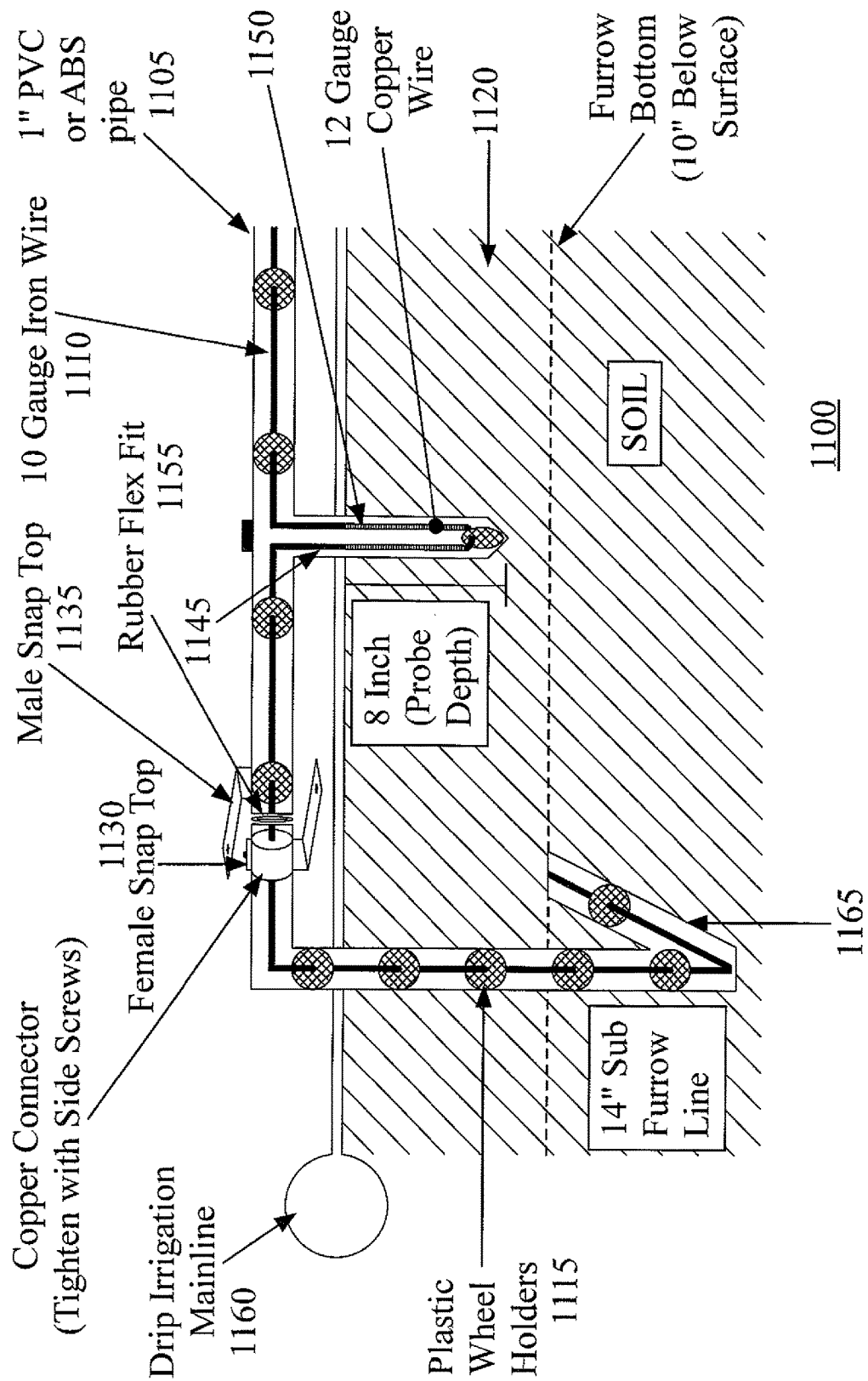
FIG. 11 depicts and embodiment for assembling underground loop connectors.

FIG. 11 depicts an embodiment 1100, in which an array of straight line pipes 1105 have wires 1110, held by wheels 1115 of high-density plastic, and fixation of the segments 1105 formed using ABS glue. The array is placed on the top-center of bed 1120. Straight line connectors 1105 can then be added after a global positioning system GPS lister makes the beds. Vertical PVC pipe segments 1140 with descending and ascending conductive wires 1145 and 1150, respectively, are shown.

Protective end-caps (not shown), such as a rubber caps or "flex-fits," are added to the ends of the straight line connector pipes 1105 when they are not connected, to ensure the metal parts of the system do not oxidize with weathering. During field operations and after harvest, the straight line connectors 1105 can be disconnected and stored in a secure area when they are not in use. In an embodiment, the end-caps are formed of rubber, although alternative embodiments using other flexible, weather and moisture-resistant materials are contemplated.

In these embodiments, fixation comprises a female snap trap top 1030, a male snap trap 1035, or a rubber flex fit 1055 or an adhesive such as ABS glue. Alternative embodiments contemplate the use of other high-density nonconductive materials for the plugs, and bonding, welding, or bolting for the fixations. Also shown is drip irrigation mainline 1055, and the underground segments are shown at a depth of about 10" below ground level.

Individual units are built and assembled individually to match the length of run for the field. Before connecting the straight line connectors 1105 to permanent underground loop connectors, all units are assembled above ground to extend the length of a 40" bed. Different lengths of Straight Line Connectors may be created to perfectly fit the bed.

Also, as shown in FIG. 11, an embodiment of the Straight Line Connectors comprises a moisture-impermeable pipe, which contains an electrically conductive wire, as vertical and horizontal straight lines within the PVC pipe. In an embodiment, the moisture-impermeable pipe is formed of one inch PVC pipe and the conductive wire is formed of single 10 gauge iron wire. Alternative embodiments contemplate the use of alternative moisture-impermeable materials and diameters for the pipe, and alternative conductive materials and diameters for the conductive wire.

Example 7: Alternative Embodiment of Straight Line Connector

Figure 12:
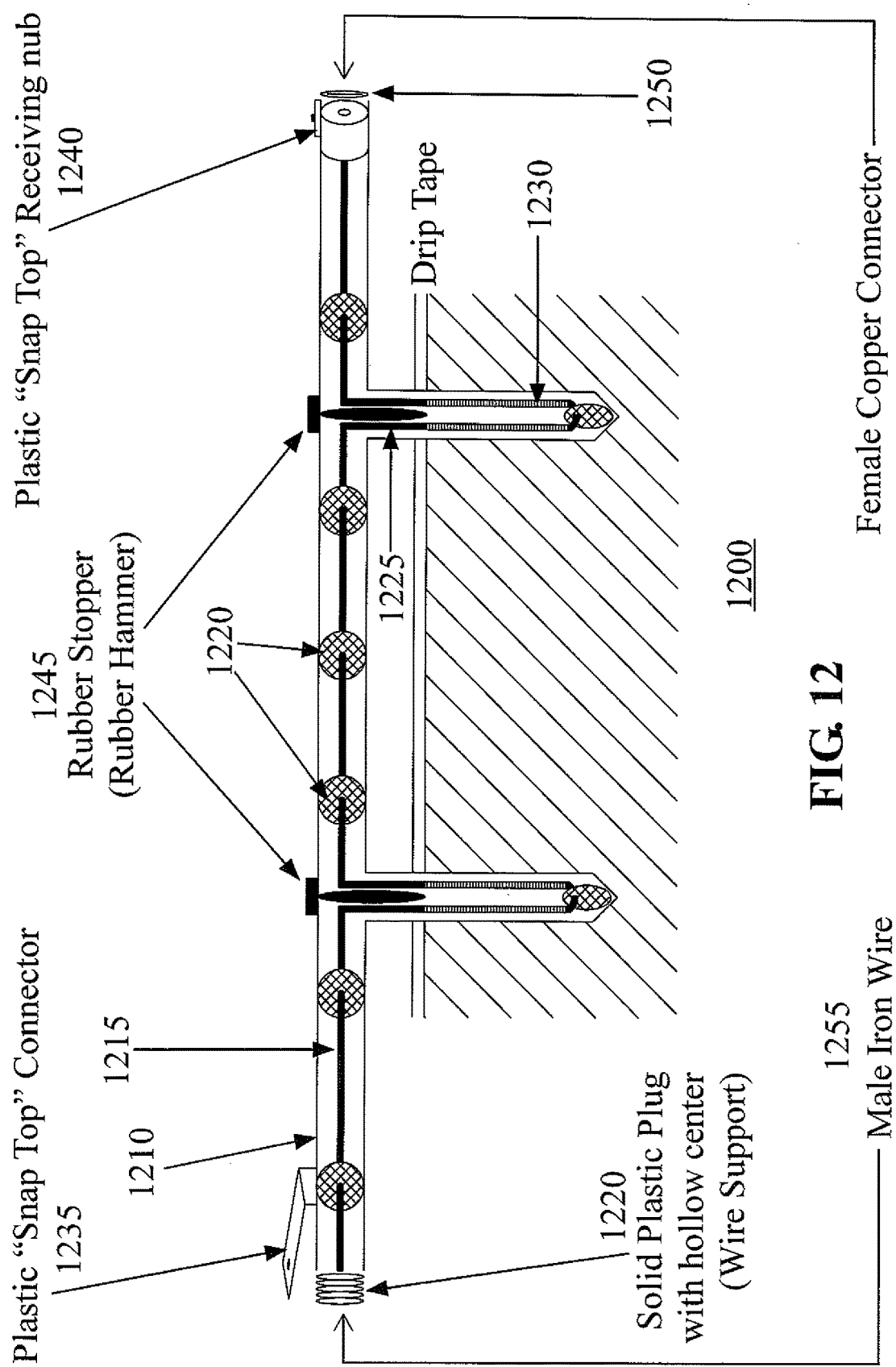
FIG. 12 depicts an alternative embodiment of a straight line connector.

FIG. 12 depicts an alternative embodiment 1200 of a straight line connector 1205 comprising pipe 1210, having conductor 1215 therein, and having conductor supports 1220, descending conductive wire 1225 and ascending conducting wire 1230, respectively, male snap top connector 1235, female snap top receiving end 1240, and rubber stoppers 1245 inserted between descending and ascending loops 1225.

In an embodiment, the male snap top connector 1235 is formed of 10 gauge iron and the female connector 1240 is a female copper connector, although the use of alternative conductive materials and diameters is contemplated.

Example 8: Alternative Female Connector

Figure 13:
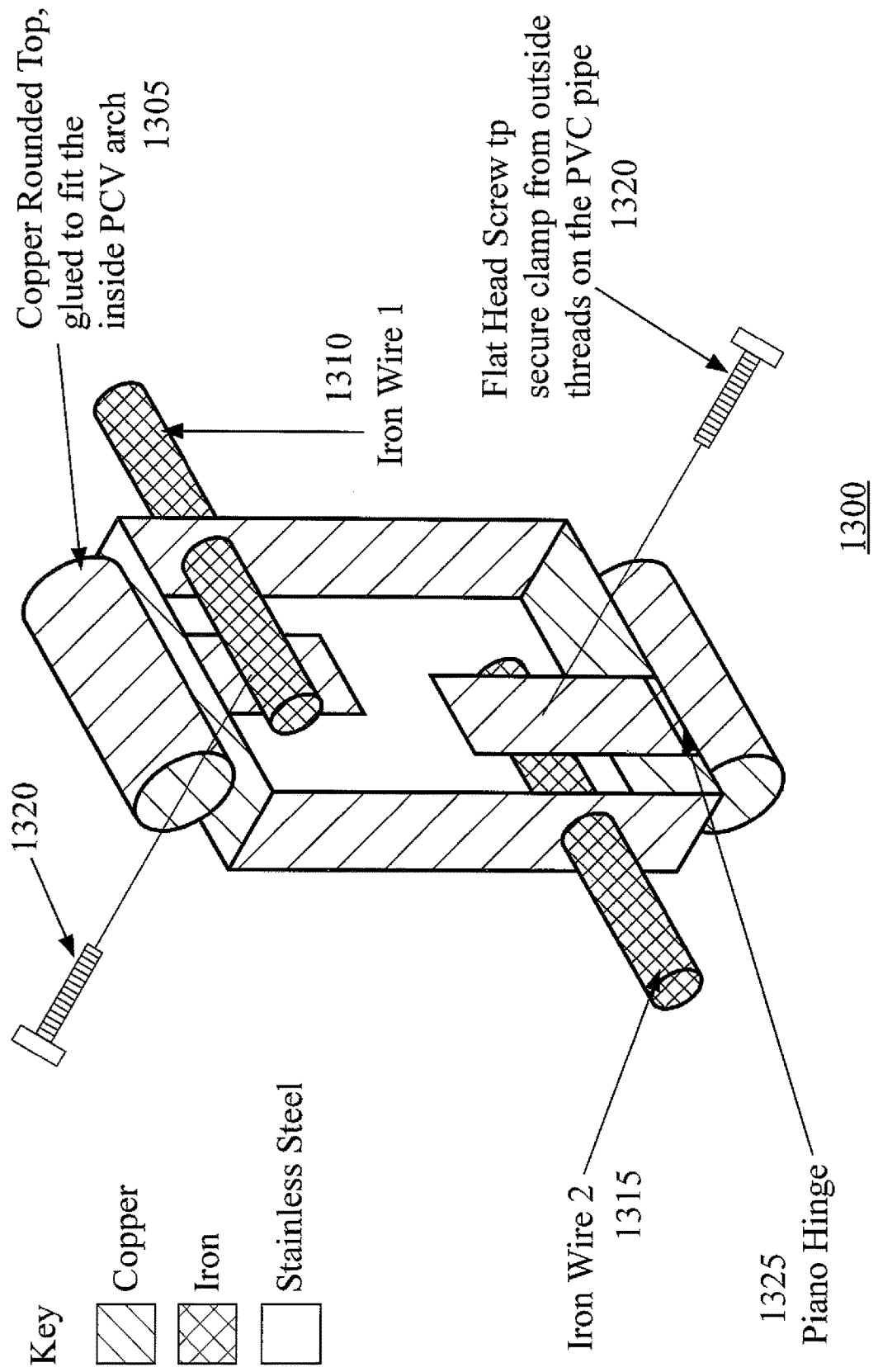
FIG. 13 depicts an alternative embodiment of a female connector.

FIG. 13 depicts an alternative embodiment 1300 of a female connector showing female copper connectors 1305 soldered together into the shape of a square. Iron wire 1 1310 and iron wire 2 1315 are depicted, as are stainless steel flat head screws 1320 to hold wires 1310 and 1315 in electrical contact with copper connectors 1305. Plano hinge 1325 is also shown. Alternative embodiments contemplate the use of other methods of forming such as by extrusion, and other shapes such as rounded squares, circles, or other shapes can also be made and used.

Example 9: Electrical Conductivity of Nitrate Fertilizer

Purpose:

To assess whether or not nitrogen based fertilizers are conductive to electricity and to visually evaluate brightness, so as to give each of them a general grade (low-medium-high).

Materials:
1. Quantity: 9, 12 ounce clear plastic cups.
2. Quantity: 3 six inch pieces of 24 gauge copper wire.
3. Quantity: 1, 5 mm Red LED light (2.6 volt, 28 mA, 10 mcd).
4. Quantity: 1 AA Battery.
5. Roll of Electrical Tape.
6. Small alligator clips (Conductive).
7. Liquid Fertilizers: 12-0-0-26 s, 10-34-0, AN20, UAN 32, CN9.
8. Other liquids: Bottled Water (Control), Tap Water, Distilled Water, and Salt Water (bottled water mixed with Sodium Chloride).

Procedure:
1. Cut three 6 inch pieces of 24 gauge copper wire.
2. Placed the first piece of wire into a plastic cup with a 90 degree angle bend about 1 inch long, so that it ran parallel to the bottom of the cup and is about ½ inch away from the bottom of the cup. Bent the other end of the wire over the top of the cup and secured with electrical tape inside the cup.
3. Placed the second piece of wire into the cup and repeated step two, producing two 90 degree angle wires facing each other at the bottom of the cup in a straight line, with about 1 inch distance of space between them. Secured the second wire to the inside top of the cup with electrical tape.
4. Attached the end of the first piece of wire (outside of the cup) to the negative side of one AA battery with electrical tape.
5. Used the third piece of copper wire and attached it to the positive side of the AA battery with electrical tape.
6. Attached the positive side of the LED light to the end of the second piece of wire with electrical tape or small alligator clips.
7. Poured the testing substance into the cup so that the two 90 degree angled wires were completely submerged in liquid.
8. Turned off the lights in the room and touched the free end of the third piece of wire to the negative cathode (short lead) LED light. Determined conductive results by viewing the strength of brightness of the LED.
9. Used a new cup for each fertilizer or water source that was tested.

Results:
Results are expressed below in Table 1.

TABLE 1

| Liquid Tested | Did it conduct? | LED Brightness |
| --- | --- | --- |
| 12-0-0-26s (Ammonium Thiosulfate) | Yes | Very High |
| 10-34-0 (Ammonium Polyphosphate) | Yes | High |
| UAN 32 (Urea Ammonium Nitrate) | Yes | Medium |
| AN20 (Ammonium Nitrate 20%) | Yes | Medium |
| CN 9 (Calcium Nitrate) | Yes | Low |
| Salt water | Yes | Low |
| Tap Water | Yes | Very Low |
| Bottled Water (Control) | No | None |
| Distilled water | No | None |

Pictures

Illustrations of the experiment are shown in FIGS. 14A, 14B, and 14C. The left panel of FIG. 14 (FIG. 14A) shows a top view of a cup 1405 used for testing, with wires 1410 and 1415 attached to the bottom of the cup and secured with electrical tape to the insides of the cup. Note that there is about 1" of free space between the wires, so wires are not connected.

The middle panel of FIG. 14 (FIG. 14B) shows an oblique view of a cup 1405 that contains 10-34-0 liquid fertilizer, which was used for conductive testing. Wire 1420 inside the cup, which folded over the top of the cup and extended down the outside of the cup, was connected to the negative side of a single AA battery 1425. A small piece of wire was then added to the positive side of the AA battery, which was used to touch the positive side of the LED light 1431 and created a glow (confirming conduction). The other wire that exited the cup was connected to the negative lead of the LED light.

The right panel of FIG. 14 (FIG. 14C) depicts the completion of a closed circuit and confirmed electrical conduction through the solution containing fertilizer. The LED red glow 1430 confirmed that a current was conducted through the 10-34-0 (Ammonium Polyphosphate) fertilizer, acting as a conductor between the wires that were inside of the cup.

Notable Observations:

When pouring more of the same fertilizer into the test cup, the LED light grew intensely brighter for a period of a few seconds before dimming back down to its original brightness reading. Stirring the fertilizer also temporarily increased light intensity.

Summary of Results:

I confirmed that all nitrogen based fertilizers used in this experiment were conductors of electricity. Because we are dealing with electrolytes as nitrates, or other anionic fertilizers, it makes sense that they are highly soluble and will conduct a current quite well in solution.

CONCLUSIONS

Because fertilizers conduct electricity, I conclude that the electron movement within the medium can be influenced by a magnetic field. I further conclude from this study that using electric currents to produce magnetic fields within a bed can interact with ionic fertilizers, including nitrates, thiosulfates, and polyphosphates, and retain them near the root systems of plants growing in the beds. I further conclude that using embodiments of this invention can reduce leaching of ionic fertilizers, including nitrates, thiosulfates, and polyphosphates, and thereby reduce the need for application of such fertilizers, reduce environmental groundwater and run-off contamination, and reduce the cost of plants grown using the described methods and systems.

What is claimed is:

1. A device for producing a magnetic field within an agricultural bed to decrease leaching of an ionic fertilizer, comprising:
a first insulated vertical pipe segment having generally curved, closed side wall enclosing a space therein having a central axis, an open end, and a closed end;
said space having within it:
an electrically conductive first elongated element having a first end and a second end,
a second elongated electrically conductive element having a first end and a second end;
each of said second ends within said space near said closed end being electrically connected to each other, forming an electrically conductive loop within said closed end, at least one of said electrically conductive elongated elements being coated with an anti-oxidant;
said first end of said first elongated element and said first end of said second element having electrically conductive portions extending through said open end of said vertical pipe segment,
said first elongated element and said second elongated element being separated within said space except for the electrically conductive loop;
said first end of said first conductive element being connected to an anode of source of electric power,
said first end of said second conductive element being connected to a cathode of said source of electric power, thereby producing a magnetic field with field lines generally oriented at right angles to said central axis of said at least one of said vertical pipes, wherein in use, said magnetic field decreases leaching of ionic fertilizer from said agricultural bed; and further comprising:
an insulated straight line connector pipe segment having a generally curved closed side wall enclosing a space therein having a central axis and two ends, said sidewall having an opening therethrough, said space having a first and a second elongated conductive element therein generally parallel to said central axis;
said open end of said first insulated pipe segment being sealingly attached to said insulated straight line connector pipe segment, said central axis of said first pipe segment being at an angle with respect to said central axis of said insulated straight line connector pipe segment, so that said first elongated pipe segment of becomes a vertical pipe segment, where the space of said vertical pipe segment is in continuity with said space of said straight line connector pipe segment,
said first end of said first electrically conductive elongated element of said vertical pipe segment is electrically connected to a first conductive elongated element within said space of said insulated straight line connector pipe segment,
said second end of said first electrically conductive elongated element of said vertical pipe segment being electrically connected to a second conductive elongated element with said insulated straight line connector pipe segment; and said first and second conductive elongated elements within said straight line connector pipe segment extending through said open ends of said straight line connector pipe segment.

2. The device of claim 1, further comprising a power source electrically connected to said first and second conductive elongated elements extending from said open ends of said straight line connector pipe segment.

3. The device of claim 2, said power source being an alternating current (AC) source.

4. The device of claim 3, further comprising a plurality of vertical pipe segments attached to said straight line connector pipe segment.

5. The device of claim 4, each of said vertical pipe segments having a length in the range of about 4 inches to about 36 inches,
said vertical pipe segments are spaced apart on said straight line connector pipe segment with a spacing of about 6 inches to about 4 feet, thereby forming a linear array of vertical pipe segments attached to a straight line connector pipe segment, thereby producing a one-dimensional array of vertical pipe segments.

6. The device of claim 5, further comprising a plurality of additional vertical pipe segments arranged generally in parallel to each other, each of said straight line connector pipe segments being electrically connected to each other in series with said power source, and having a lateral spacing in the range of about 12 inches to about 4 feet, thereby forming a two-dimensional array of vertical pipe segments.

7. The device of claim 2, said power source being a direct current (DC) source.

8. A method for reducing leaching of an ionic fertilizer into ground water, comprising:
providing a device of claim 1;
inserting said device into a bed of soil;
connecting said device to a source of electrical power; and
causing an electrical current to flow through said loop, thereby producing a magnetic field with magnetic field lines generally oriented at right angles to said central axis of said device, wherein said magnetic field lines interact with said ionic fertilizer to impede leaching of said ionic fertilizer into ground water.

9. A method for reducing leaching of an ionic fertilizer into ground water, comprising:
providing a device of claim 6;
inserting the vertical segments of said device into a bed of soil;
connecting said device to a source of electrical power; and
causing an electrical current to flow through at least one of said plurality of loops, thereby producing at least one magnetic field with magnetic field lines generally oriented at right angles to said central axis of said at least one of said vertical pipes, wherein said magnetic field interacts with said ionic fertilizer to impede leaching of said ionic fertilizer into ground water.

10. The method of claim 9, where said source of electrical power is an alternating current (AC) source, operating at:
a voltage of from about 1.0 Volt (V) to about 100 V,
a frequency of from about 60 Hertz (Hz) to about 1 gigaHertz (GHz), and
a power of from about $10^{-2}$ Amperes (A) to about 15 A.

11. The method of claim 9, where the magnetic field strength of at least one of said plurality of magnetic fields is in the range of about $10^{-6}$ Tesla (T) to about 1.0 T.

12. The method of claim 11, said magnetic field strength of at least one of said plurality of magnetic fields is measured using a Gauss meter.

13. The method of claim 12, said Gauss meter comprising a generally planar sensor and detects the magnetic field strength above the surface of said bed.

14. The method of claim 12, said Gauss meter comprising a probe inserted into the bed of soil to measure magnetic field strength under the surface of said bed.

15. The method of claim 11, said magnetic field strength being estimated at the surface of said bed of soil using a piece of non-conductive material having a later of black sand magnetite ($Fe_3O_4$) thereon.

16. The method of claim 11, said ionic fertilizer selected from the group of nitrates, phosphates, and sulfates.

17. The method of claim 11, where said fertilizer is selected from the group consisting of ammonium thiosulfate (12-0-0-26s), ammonium polyphosphate (10-34-0), urea ammonium nitrate (UAN 32), ammonium nitrate 20% (AN20), and calcium nitrate (CN9).

* * * * *